(12) United States Patent
Fujimoto et al.

(10) Patent No.: US 6,595,315 B1
(45) Date of Patent: Jul. 22, 2003

(54) UNDERWATER DETECTING APPARATUS, DEPTH MEASURING APPARATUS AND DISPLAY APPARATUS

(75) Inventors: Hiroyasu Fujimoto, Nishinomiya (JP); Hiroshi Nagano, Nishinomiya (JP); Makoto Obuchi, Nishinomiya (JP); Itsuo Makino, Nishinomiya (JP)

(73) Assignee: Furuno Electric Company, Limited, Hyogo-ken (JP)

( * ) Notice: Subject to any disclaimer, the term of this patent is extended or adjusted under 35 U.S.C. 154(b) by 0 days.

(21) Appl. No.: 09/662,627

(22) Filed: Sep. 15, 2000

(30) Foreign Application Priority Data

| Sep. 17, 1999 | (JP) | ............................................. | 11-264478 |
| Sep. 22, 1999 | (JP) | ............................................. | 11-267893 |
| Dec. 3, 1999 | (JP) | ............................................. | 11-344295 |

(51) Int. Cl.[7] .............................................. G01S 15/00
(52) U.S. Cl. ...................................... 181/124; 367/111
(58) Field of Search ................................ 181/108, 110, 181/118, 120, 124; 367/95–101, 103, 105, 106, 107–115

(56) References Cited

U.S. PATENT DOCUMENTS

| 4,644,511 A | | 2/1987 | Asakura | |
| 4,873,676 A | * | 10/1989 | Balley et al. | ................ 367/111 |
| 4,935,906 A | * | 6/1990 | Baker et al. | ................ 367/111 |
| 5,184,330 A | | 2/1993 | Adams et al. | |
| 5,327,398 A | | 7/1994 | Wansley et al. | |
| 5,594,707 A | | 1/1997 | Goto et al. | |
| 5,675,552 A | | 10/1997 | Hicks et al. | |

FOREIGN PATENT DOCUMENTS

GB    1591756    6/1981

* cited by examiner

Primary Examiner—Khanh Dang
(74) Attorney, Agent, or Firm—Birch, Stewart, Kolasch & Birch, LLP

(57) ABSTRACT

A screen on which water depth information obtained from an echo signal is historically displayed and a screen on which fish school detection information obtained from an echo signal is displayed, are displayed side by side on a display screen of a display instrument or either one is displayed by switching. Thus, a large amount of information is displayed on a limited space of a small display instrument efficiently and effectively and to be easy to see. Further, when a water depth value becomes a set value of an alarm water depth mark or less, an alarm is displayed on the display screen of the display instrument, and an alarm is given by sound. At the same time as this, the brilliance of the display screen is raised to the maximum brilliance to make the screen brighter, so that the contents of the alarm are made easy to see. Thus, quick measures can be taken in an emergency. Moreover, after a mode is set to a help mode by a mode switch, when any one of keys in an operation portion is pushed, guidance of the function, operation procedure, and the like of the pushed key is displayed on a display portion. Thus, the guidance as to the key can be displayed by a simple operation in a help mode.

15 Claims, 28 Drawing Sheets

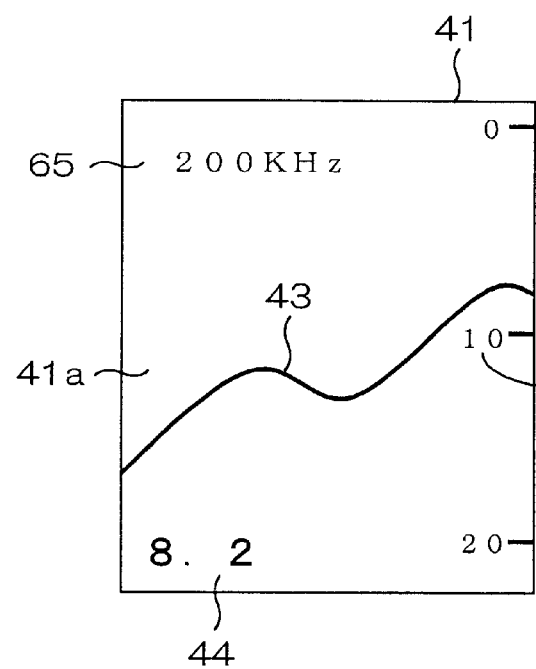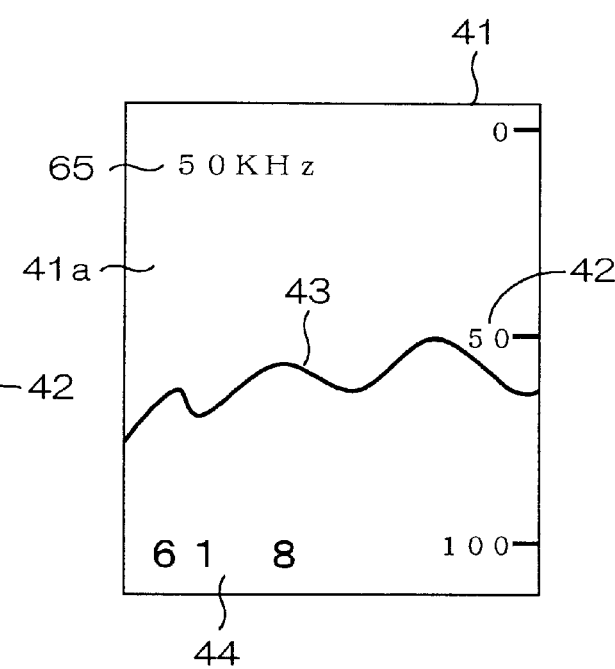

UNDERWATER DETECTING APPARATUS, DEPTH MEASURING APPARATUS AND DISPLAY APPARATUS

BACKGROUND OF THE INVENTION

The present invention relates to an underwater detecting apparatus for performing measurement of water depths, detection of a school of fish, or the like by using ultrasonic waves, and a depth measuring apparatus having the same function. Besides, the present invention relates to a display apparatus which is installed in a ship or the like and displays an alarm on a screen in an emergency, and which is provided with a function of displaying guidance as to a key, and a depth measuring apparatus having the same function.

A depth measuring apparatus in which an ultrasonic signal is emitted into the water from an echo sounder transducer provided on a ship's hull and the water depths are measured on the basis of received echo signals, has been conventionally used. In such a conventional depth measuring apparatus, measured data are recorded on a recording sheet and are outputted.

However, in the conventional depth measuring apparatus, paper as a recording medium is used, and this is a consumption article so that this is costly, and this is also inconvenient in handling such as exchange of recording sheets or preservation thereof. Besides, in the depth measuring apparatus of such a recording sheet system, a mechanism for making a record on the recording sheet, and this mechanism includes movable portions such as a gear and belt, so that there is also a problem that the apparatus is inferior in reliability.

Then, instead of the above recording sheet system, it is conceivable to make a system in which measurement data are displayed on a display instrument such as a liquid crystal display. According to this, the recording sheet becomes unnecessary, and data can be electrically stored, and further, any movable mechanism is not necessary, so that the reliability is improved, and the defects of the conventional apparatus can be overcome.

However, since a display instrument mounted on a ship is generally small and the space of a display screen is also limited, when a depth measurement result is displayed on the screen, it is demanded that the largest possible amount of information is displayed efficiently and to be easy to see.

Besides, a ship is equipped with various measuring apparatuses such as a radar apparatus, a fish finder, a tidal current meter, a water temperature meter, and a depth measuring apparatus, and information measured by these apparatuses is displayed as an image on a screen of a display instrument. Here, for example, when a water depth to the seabed measured by the depth measuring apparatus becomes a definite value or less, since there is a fear that the ship strands, that must be informed by an alarm. Thus, it is designed such that the alarm to indicate water depth abnormality is displayed on the screen of the display instrument of the depth measuring apparatus, and this alarm is also given by sound. The depth measuring apparatus provided with such an alarm display function is disclosed in, for example, Japanese Patent Unexamined Publication No.223583/1993.

At the time of a night cruise or the like of a ship, since the surroundings of the display instrument in a room are dark, when the brilliance of the display instrument is raised, a reflection is formed in a glass window or dazzle is given to a navigator, so that it is not preferable in view of safety of the cruise. Then, at a place where the surroundings are dark, the display instrument is set at low brilliance when in use.

However, in the case where some alarm is raised in a state where the display instrument is set at low brilliance, the contents of the alarm displayed on the screen are difficult to understand, since the display screen is dark. In order to accurately grasp this, the brilliance of the screen should be again set at high brilliance to confirm the alarm. Thus, it takes a time to take measures, and there has been a danger that a serious accident such as stranding is caused by a time delay during this. Besides, in an instrument which gives an alarm by sound as well, in the case where there are noises in the surroundings, it is difficult to recognize the alarm sound, so that the danger is further increased.

Besides, a ship is equipped with various measuring apparatuses such as a radar apparatus, a fish finder, a tidal current meter, a water temperature meter, and a depth measuring apparatus, and information measured by these apparatuses is displayed as an image on a screen of a display apparatus. In the display apparatus, an operation portion in which a plurality of keys are arranged is provided, and these keys are operated so that various settings, instructions and the like are executed.

For example, in a depth measuring apparatus, since the position of the bottom of a ship on which a transducer of an ultrasonic beam is provided is not coincident with the position of the sea surface, a draft value of a difference therebetween is inputted through a key in advance, and a correction of a water depth value is performed by using this draft value when the water depth is calculated. Besides, in order to prevent stranding of a ship, an alarm water depth value is set by a key, and when the water depth to the seabed becomes this or less, an alarm is activated.

By the way, since various keys are provided on the operation portion, it is difficult for a person unskilled in the operation to completely understand and memorize the functions of the respective keys. Thus, in general, this kind of apparatus is provided with a help function for displaying guidance as key functions. That is, when a mode is set to a help mode and a predetermined operation is performed, an explanation of the function, operation procedure, and the like for each key are displayed on the screen, and an operator performs the key operation while referring to this. By using such help function, the load of operation is reduced, and the operator can perform a desired key input without puzzlement.

However, in a conventional apparatus, after the mode is set to the help mode, in order to display the guidance of the key, it has been necessary to search and select an item (function, key name, etc.) related to the key from the menu or contents displayed on the help screen. In this case, when the menu or contents are hierarchically constructed, the screen is changed every time the item is selected, and it is necessary to repeat such an operation that a related item is searched and selected on the switched screen, so that a lot of trouble is required.

SUMMARY OF THE INVENTION

The present invention has been made in view of the foregoing circumstances, and an object of the present invention is to meet such a demand that when a depth measurement result is displayed on a screen, the largest possible amount of information is displayed efficiently and to be easy to see.

Another object of the present invention is to enable quick measures to be taken in an emergency by making it possible to instantaneously grasp the contents of an alarm displayed on a display instrument in a case where the alarm is given, and by certainly giving the alarm even in a case where there are noises in surroundings.

Still another object of the present invention is to display guidance as to a key in a help mode by a very simple operation.

In order to achieve the above objects, according to the present invention, a first screen in which water depth information obtained from an echo signal is historically displayed and a second screen on which fish school detection information obtained from the echo signal is displayed are displayed on a display instrument.

By doing so, since the screen of the water depth information and the screen of the fish school detection information are displayed on one display instrument, an apparatus having both functions of a depth measuring apparatus and a fish school detecting apparatus is realized, and the display instrument can be used for both. The water depth information and the fish school detection information are not displayed together on the same screen (such a display mode is adopted also in a conventional fish detector), but the water depth information and the fish school detection information are displayed as independent screens, so that more accurate and detailed information can be displayed in a mode easy to see.

In the present invention, the first screen and the second screen may be displayed side by side on the display instrument, or either one of them may be displayed by switching the screen.

Besides, in the present invention, when the apparatus having both functions of depth measurement and fish school detection is constructed, in order to simplify circuits, it is preferable to make such construction that the water depth is measured by using ultrasonic detection signals of two frequencies used for fish school detection.

Besides, in the present invention, in the case where the water depth information over a past definite period is historically displayed on the screen for displaying the water depth information, it is preferable that display contents are renewed by scroll in an area unit of 1/n of all display area, in making a display easy to see. In this case, it is also possible that the display screen of the water depth information is divided in two, the water depth information over the past definite period is displayed on one part of the display screen, the latest water depth information including the present measured depth is displayed on the other part of the screen, and the display contents of the one screen are renewed in an area unit of 1/n by scrolling the one display screen.

Besides, in the present invention, in order to measure depths in the wide range from shallow waters to deep waters and to make measurement results clearly displayed in both cases, it is preferable to automatically switch the frequency of the ultrasonic wave to a high frequency or low frequency according to a water depth.

Besides, in the present invention, in order to facilitate the prediction of change of the seabed easily on the screen, it is preferable that on the basis of the past water depth data, the change of the water depth up to now is calculated, and the result is displayed on the screen with a mark.

Besides, in the present invention, in order to secure a large display region to make it easy to see when draft is corrected, it is preferable that when a draft value is set on the screen, an oscillation line is not moved but a water depth scale is shifted upward.

Moreover, in order to achieve the above objects, in the present invention, a low brilliance screen on which a predetermined image is displayed is changed into high brilliance at an alarm time.

By doing so, at the alarm time, since the screen of the display instrument is automatically switched from low brilliance to high brilliance, the screen becomes bright and the contents of the displayed alarm can be grasped quite clearly. Besides, in an apparatus in which an alarm is given by sound as well, even in the case where there are noises in surroundings and an alarm sound is difficult to hear, the screen is changed into high brilliance so that the alarm can be visually recognized.

Here, in addition to changing the brilliance of the display screen to the high brilliance, if the display screen is made to flash on and off, attention can be aroused still more.

Besides, on the display screen, if a seabed line is historically displayed on the basis of a water depth measurement value, an alarm water depth mark as a reference to give an alarm is displayed, and the alarm is displayed together with the seabed line and the alarm water depth mark, the grasp of the contents of the alarm becomes easy still more.

Furthermore, in order to achieve the above objects, in the present invention, when a key is pushed in a help mode, guidance as to the key is displayed.

By doing so, even if related items are not searched and selected one by one from the menu, contents or the like, the guidance as to the key is instantaneously displayed by merely pushing the objective key, so that the operation becomes very simple and working efficiency is greatly improved.

BRIEF DESCRIPTION OF THE DRAWINGS

FIGS. 10A and 10B are views showing an example of a water depth display screen in the case where a frequency is switched.

DETAILED DESCRIPTION OF THE PREFERRED EMBODIMENTS

Hereinafter, preferred embodiments of the present invention will be described with reference to the drawings.

Figure 1:
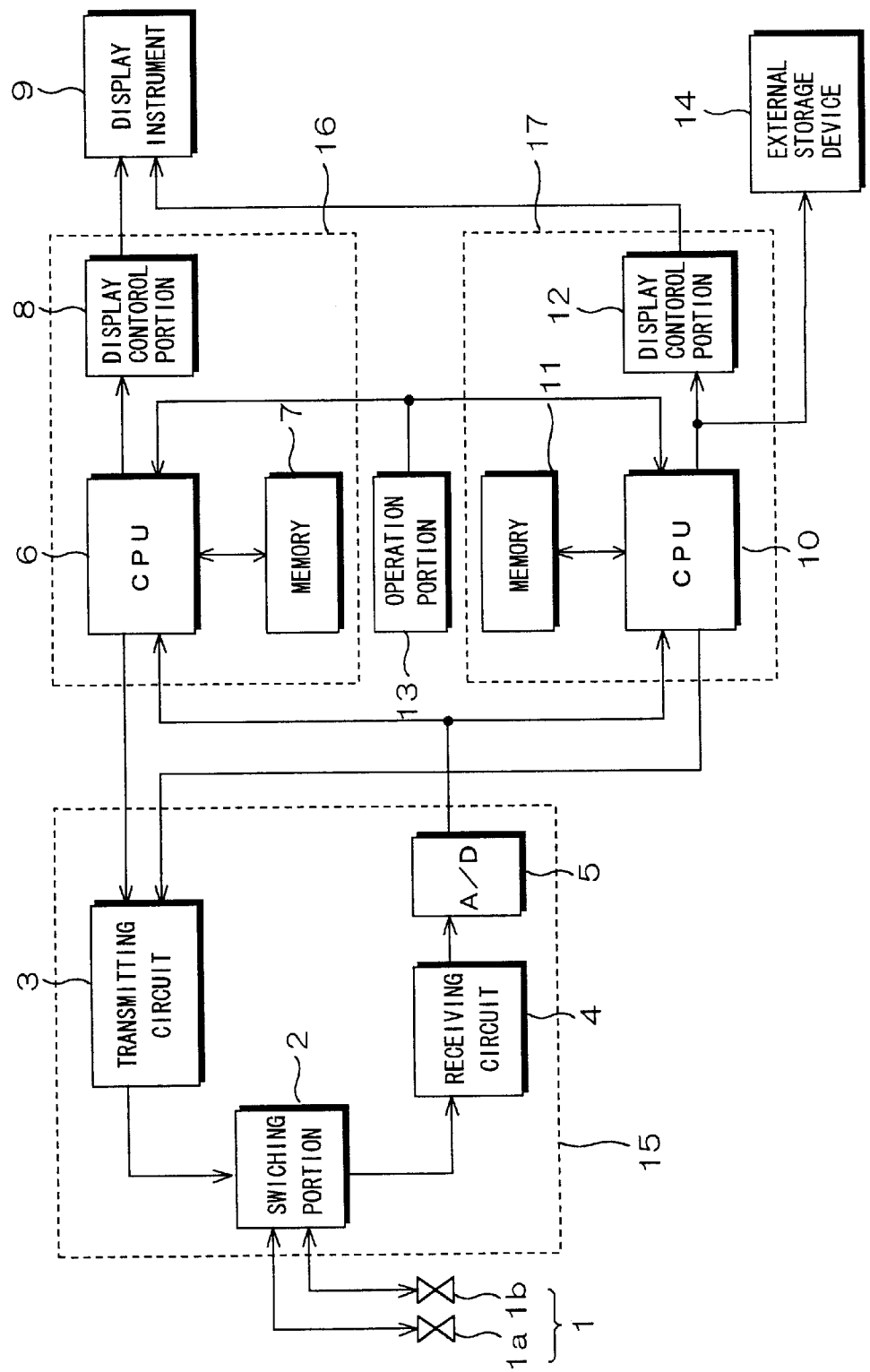
FIG. 1 is a block diagram of an underwater detecting apparatus according to an embodiment of the present invention.

FIG. 1 is a block diagram showing an example of an underwater detecting apparatus of the present invention. In the drawing, reference numeral 1 designates a transducer provided on a ship's hull and for receiving and transmitting an ultrasonic wave, which is constituted by a transducer 1*a* for a high frequency and a transducer 1*b* for a low frequency. Reference numeral 2 designates a switching portion for switching the operation of the transducer 1 between a wave transmitting unit and a wave receiving unit and between a high frequency signal and a low frequency signal; reference numeral 3, a transmitting circuit for sending a transmission signal to the transducer 1 through the switching portion 2; reference numeral 4, a receiving circuit for receiving an echo signal from the seabed received by the transducer 1 through the switching portion 2; and reference numeral 5, an A/D converter for converting an analog signal received by the receiving circuit 4 into a digital signal. A transmitter and receiver block 15 is constituted by the switching portion 2, the transmitting circuit 3, the receiving circuit 4, and the A/D converter 5.

Reference numeral 6 designates a CPU for calculating fish school information on the basis of the output from the A/D converter 5; reference numeral 7, a memory constituted by a ROM storing a program for the CPU 6 and a RAM storing various data; and reference numeral 8, a display control portion for making the fish school information displayed on a display instrument 9, and a fish detection block 16 is comprised with the CPU 6, the memory 7, and the display control portion 8.

Reference numeral 10 designates a CPU for calculating water depth information on the basis of the output from the A/D converter 5; 11, a memory constituted by a ROM storing a program for the CPU 10 and a RAM storing various data; and 12, a display control portion for making the water depth information displayed on the display instrument 9, and a depth measurement control block 17 is constituted by the CPU 10, the memory 11, and the display control portion 12.

The display instrument 9 is made of a liquid crystal display, and displays the fish school information obtained by the CPU 6 and the water depth information obtained by the CPU 10. The details will be described later. Reference numeral 13 designates an operation portion provided with keys for performing various settings or the like; and 14, an external storage device for extracting data of the water depth information and storing.

Next, the operation of the underwater detecting apparatus of the above structure will be described in brief. When a transmission instruction is given to the transmission circuit 3 from the CPU 6, the transmission circuit 3 outputs a transmission signal, and an ultrasonic signal is emitted from the transducer 1 into the water through the switching portion 2 which is switched to the wave transmission side. Here, the ultrasonic wave of a high frequency of, for example, 200 KHz is transmitted from the transducer 1*a* as described later, and the ultrasonic wave of a low frequency of, for example, 50 KHz is transmitted from the transducer 1*b*. Switching of these frequencies is performed by the switching portion 2.

The ultrasonic wave emitted from the transducer 1 is reflected by a school of fish or the seabed, and its echo signal is received by the transducer 1. This echo signal is received by the receiving circuit 4 through the switching portion 2 which is switched to the wave reception side, and is converted into the digital signal by the A/D converter 5 and is given to the CPU 6. The CPU 6 discriminates the school of fish on the basis of the echo signal, calculates the fish school detection information, and stores the result in the memory 7. The display control portion 8 outputs the data read out from the memory 7 to the display instrument 9, and the fish school information is displayed on the display instrument 9.

On the other hand, the output of the A/D converter 5 is also given to the CPU 10, and the CPU 10 calculates the water depth to the seabed on the basis of the echo signal and stores the result in the memory 11. The display control portion 12 outputs the water depth data read out from the memory 11 to the display instrument 9, and the water depth information is displayed on the display instrument 9.

The external storage device 14 takes in the water depth data obtained by the CPU 10 and stores this. This external storage device 14 is constituted by, for example, a card reader writer, in which a not-shown memory card is inserted, and the water depth data for the past 24 hours are stored in this memory card. Alternatively, the external storage device 14 may be constituted by a personal computer, and in this case as well, the downloaded water depth data for the past 24 hours are recorded in the memory device of the personal computer.

As described above, the underwater detecting apparatus of FIG. 1 has both functions of the fish school detecting apparatus and the depth measuring apparatus. Since the ultrasonic detection signals of two frequencies of 200 KHz and 50 KHz used for fish school detection are also used for measurement of the water depth, the transducer 1 and the transmitter and receiver block 15 can be used jointly, and the circuits are simplified.

Incidentally, in the case where the fish school is displayed on the display instrument 9, since it is demanded to display the fish school in detail by increasing the amount of information, the number of detection pulse signals emitted from the transducer 1 becomes large. For example, the number of pulses in the case where the water depth scale is displayed in a 20 m range is 1000 pulses/minute or more, and in the case of a 200 m range, it becomes 100 pulses/minute or more.

On the other hand, in the case where the water depth is displayed, since the undulations of the seabed does not change very much in a short time, the number of emitted detection pulses will be small. For example, in the case where it is displayed in the 20 m range, the number of pulses is 36 pulses/minute or more, and in the case of the 200 m range, it becomes 12 pulses/minutes or more. Actually, based on partial signals of the detection pulse signals emitted for fish school detection and their echo signals, the water depth information is displayed. Thus, by peak holding the echo signals for the fish school display or performing an averaging process, the water depth information can be displayed. Incidentally, in the case where the fish school information is displayed, there is a case where the seabed is not displayed by switching of the range. But, in the case where the water depth information is displayed, the seabed must be displayed without fail.

Figure 2:
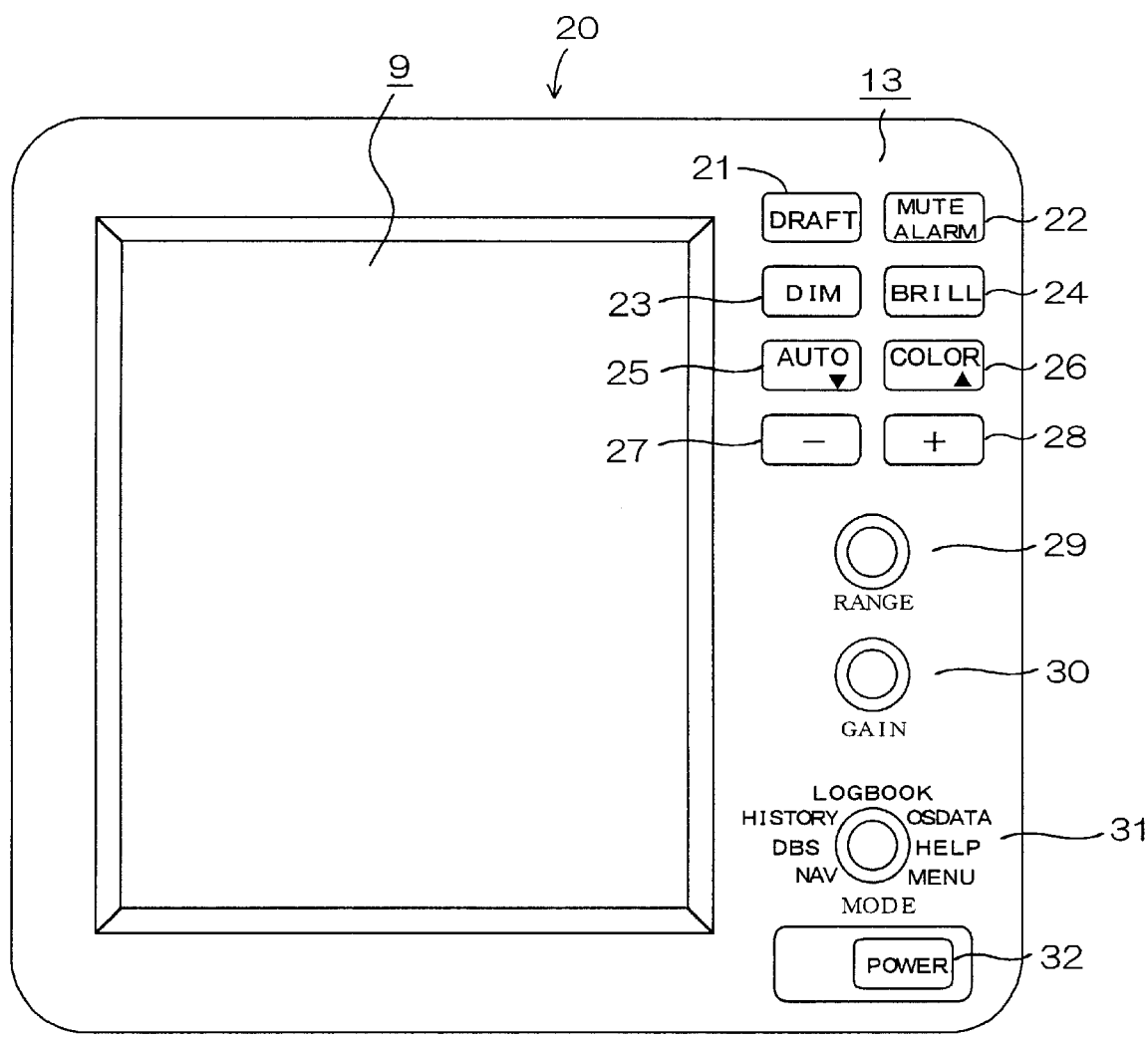
FIG. 2 is a front view of a display unit of the underwater detecting apparatus.

FIG. 2 shows an example of a display unit 20 of the underwater detecting apparatus. In the display unit 20, the operation portion 13 is provided at a right side of the display instrument 9. The display instrument 9 is made of a TFT (Thin Film Transistor) color liquid crystal display, and is a small display with a display area of, for example, 133×97 mm.

Figure 3:
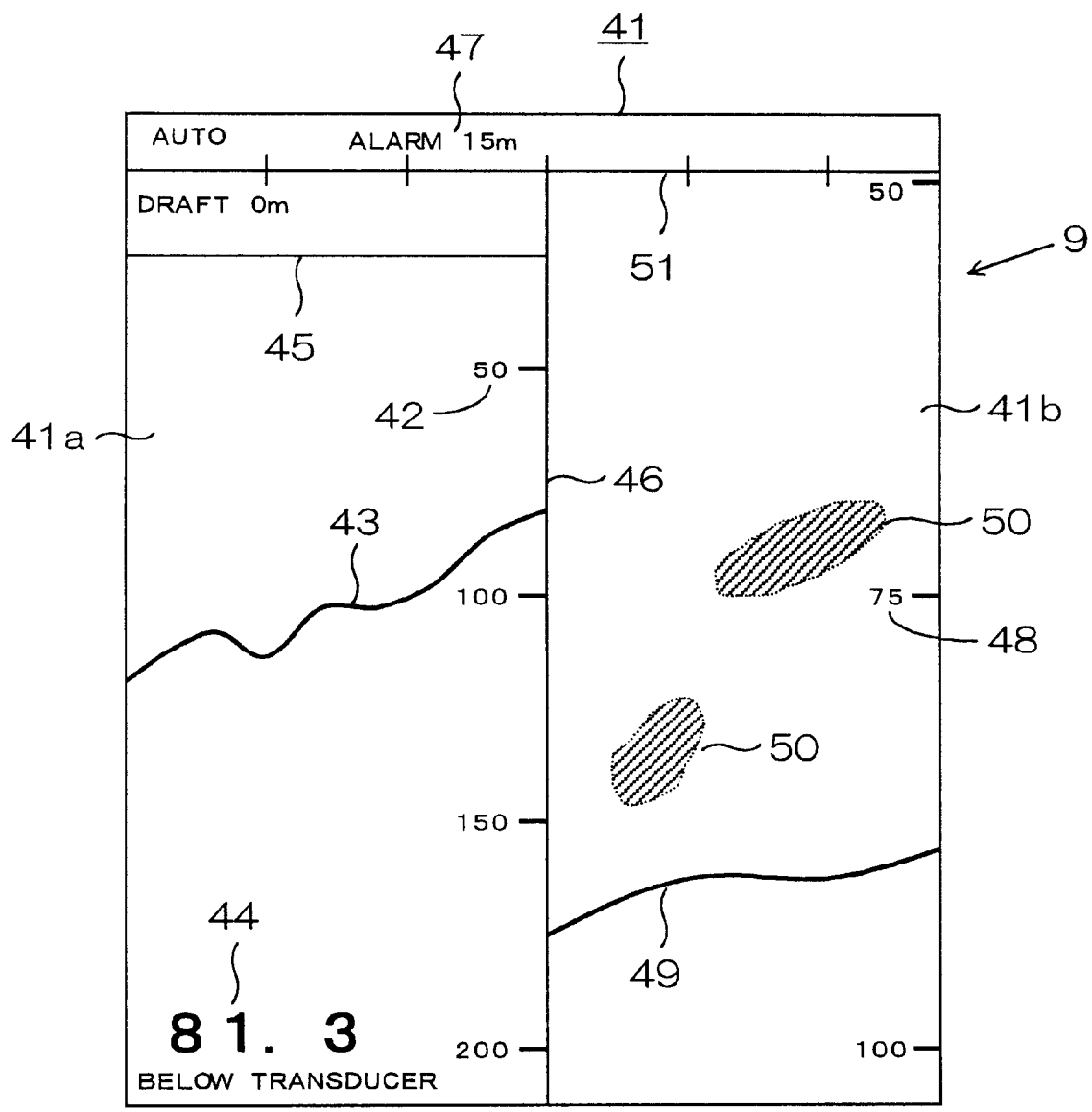
FIG. 3 is a view showing an example of a display on the screen.

FIG. 3 shows an example of a display screen 41 of the display instrument 9. In FIG. 3, two independent screens 41*a* and 41*b* are displayed side by side on the display screen 41. The screen 41*a* is a screen on which the water depth information obtained by the depth measurement control block 17 of FIG. 1 is displayed, and the screen 41*b* is a screen on which the fish school detection information obtained in the fish detection block 16 of FIG. 1 is displayed.

On the screen 41*a*, reference numeral 42 designates a water depth scale provided at intervals of 50 meters; reference numeral 43, a seabed line displayed on the basis of measured water depth values, and the seabed line 43 is continuously displayed as a history on the basis of the data for a definite period. That is, the seabed line 43 at the position of a right end 46 of the screen 41*a* is the latest seabed line measured presently, and toward the left from this position, the seabed line for at least the past 15 minutes is displayed. Reference numeral 44 designates a measured present water depth indication, and the water depth value of 81.3 m of the seabed line 43 at the end 46 is displayed. Reference numeral 45 designates an alarm water depth line as the reference to give the alarm. The alarm water depth line 45 can be arbitrarily set, and here, it is set to 15 m, and when the water depth is at this one or less, the alarm will be produced. Reference numeral 47 designates a display portion for displaying the set alarm water depth value.

Besides, on the screen 41*b*, reference numeral 48 designates a water depth scale provided at intervals of 25 meters; 49, a seabed line; and 50, an image of a school of fish displayed on the basis of echo signals, and the display contents are similar to a display screen of a conventional fish detector. Incidentally, reference numeral 51 designates an oscillation line indicating the position of the transducer 1 fixed to the ship's hull.

In this way, the screen 41a displaying the water depth information and the screen 41b displaying the fish school detection information are displayed side by side, so that a large amount of information can be displayed on the limited display screen 41, and an efficient display can be made. In FIG. 3, although the screen 41*a* and the screen 41*b* are respectively displayed on half of the display screen 41, for example, the screen 41*a* of the water depth information may be display on ⅕ of the display screen 41, and the screen 41*b* of the fish school detection information may be displayed on the remaining ⅘, and the ratio can be arbitrarily selected.

Incidentally, since the latest image is always displayed at the position of the right end 46 on the display screen 41a of the water depth information, it is necessary to make renewal by sending the image at regular intervals. The time interval of the image feed is set to, for example, 15 minutes in a normal mode. Besides, by making a mode a fast-forwarding mode, it can be sent at high speed corresponding to the range. For example, it can be sent at 10 second intervals for the 10 m range, 15 second intervals for the 20 m range, 1 minute intervals for the 60 m range, 1.5 minute intervals for the 100 m range, and 2 minute intervals for the 200 m range. However, even in this case, a measurement value is displayed at 1 second intervals on the water depth data value indication 44. The display screens of the water depth information in the following embodiments are also the same.

On the other hand, in the operation portion 13 of FIG. 2, reference numeral 21 designates a draft key for setting a draft value; 22, an alarm key for setting the foregoing alarm water depth line 45; 23, an illumination adjusting key for adjusting the panel illumination of the operation portion 13; 24, a brilliance adjusting key for adjusting the screen brilliance of the display instrument 9; 25, an automatic key for changing the automatic/manual operation of range, sensitivity or the like; 26, a color key for adjusting the color tone of the display instrument 9; 27, a minus key for scrolling the display of the water depth history displayed on the display instrument 9 in a reverse direction (left direction) or for decreasing set values; and 28, a plus key for scrolling the display of the water depth history displayed on the display instrument 9 in a positive direction (right direction) or for increasing set values.

Reference numeral 29 designates a range switch for changing the display range of the display instrument 9; 30, a gain switch for adjusting sensitivity; 31, a mode switch for switching a mode; and 32, a power switch of the display unit 20. The mode of the mode switch includes a NAV mode displaying a basic screen, a DBS (Depth Below Surface) mode displaying a screen by draft correction, a HISTORY mode displaying past water depth history in a graph form, a LOGBOOK mode displaying the past water depth history in a table form in which a time is made to correspond to a water depth value, an OSDATA mode displaying the position and speed of a ship, a water depth, or the like, a HELP mode displaying an explanation of operation and function, and a MENU mode for selecting a menu of various functions.

Figure 4:
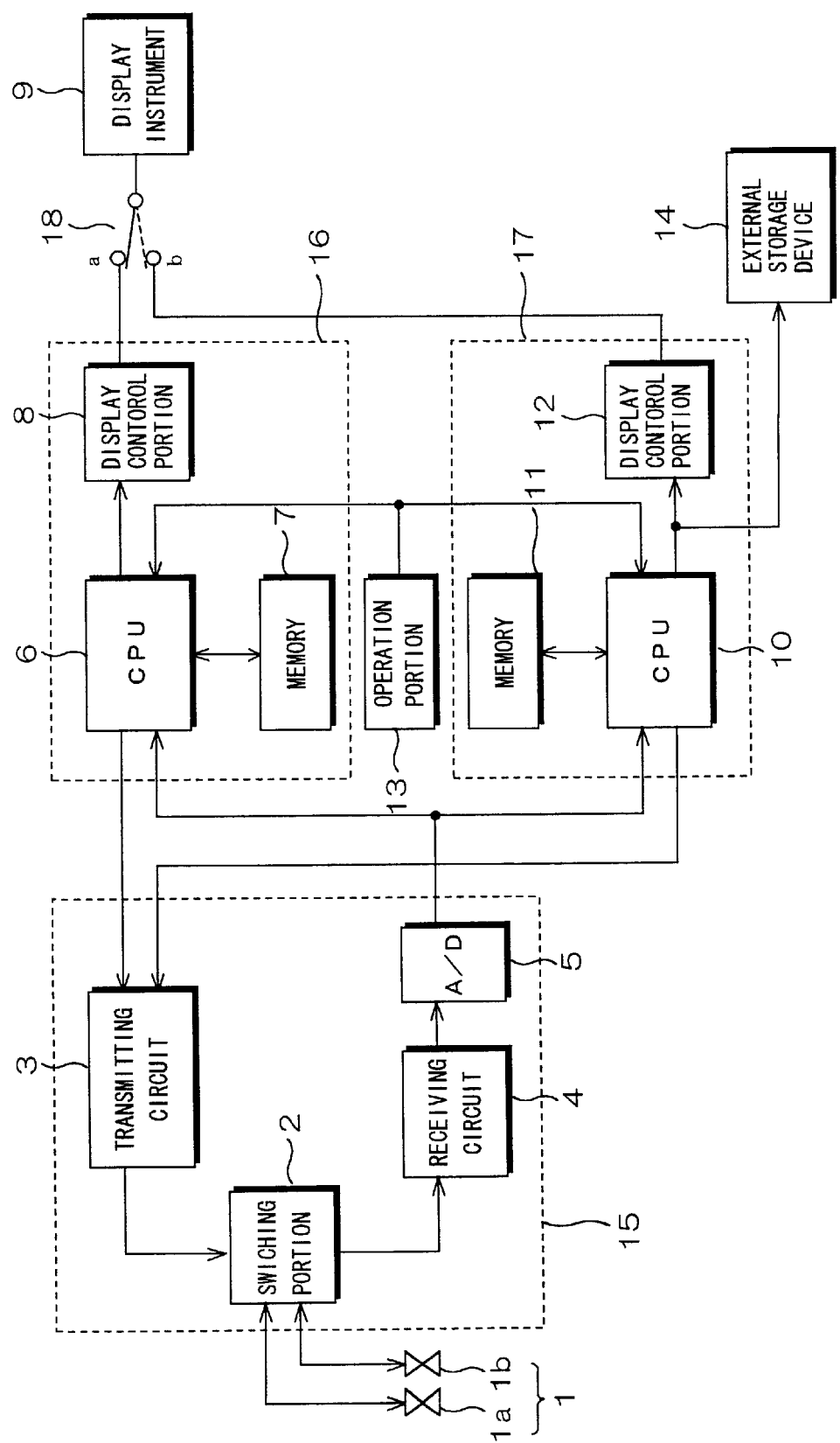
FIG. 4 is a block diagram of an underwater detecting apparatus according to another embodiment of the present invention.

In FIG. 3, although the two display screens 41*a* and 41*b* are displayed side by side at the same time, it is also possible to display either one by switching the display screens 41*a* and 41*b*. FIG. 4 shows a circuit for that purpose, and the same portions as those of FIG. 1 are designated by the same symbols. In FIG. 4, a selector switch 18 is provided between a display control portion 8 and a display instrument 9 and between a display control portion 12 and the display instrument 9. This selector switch 18 may be provided at a suitable place of the display unit. Since the other constructions are the same as FIG. 1, the explanation is omitted.

Figure 5:
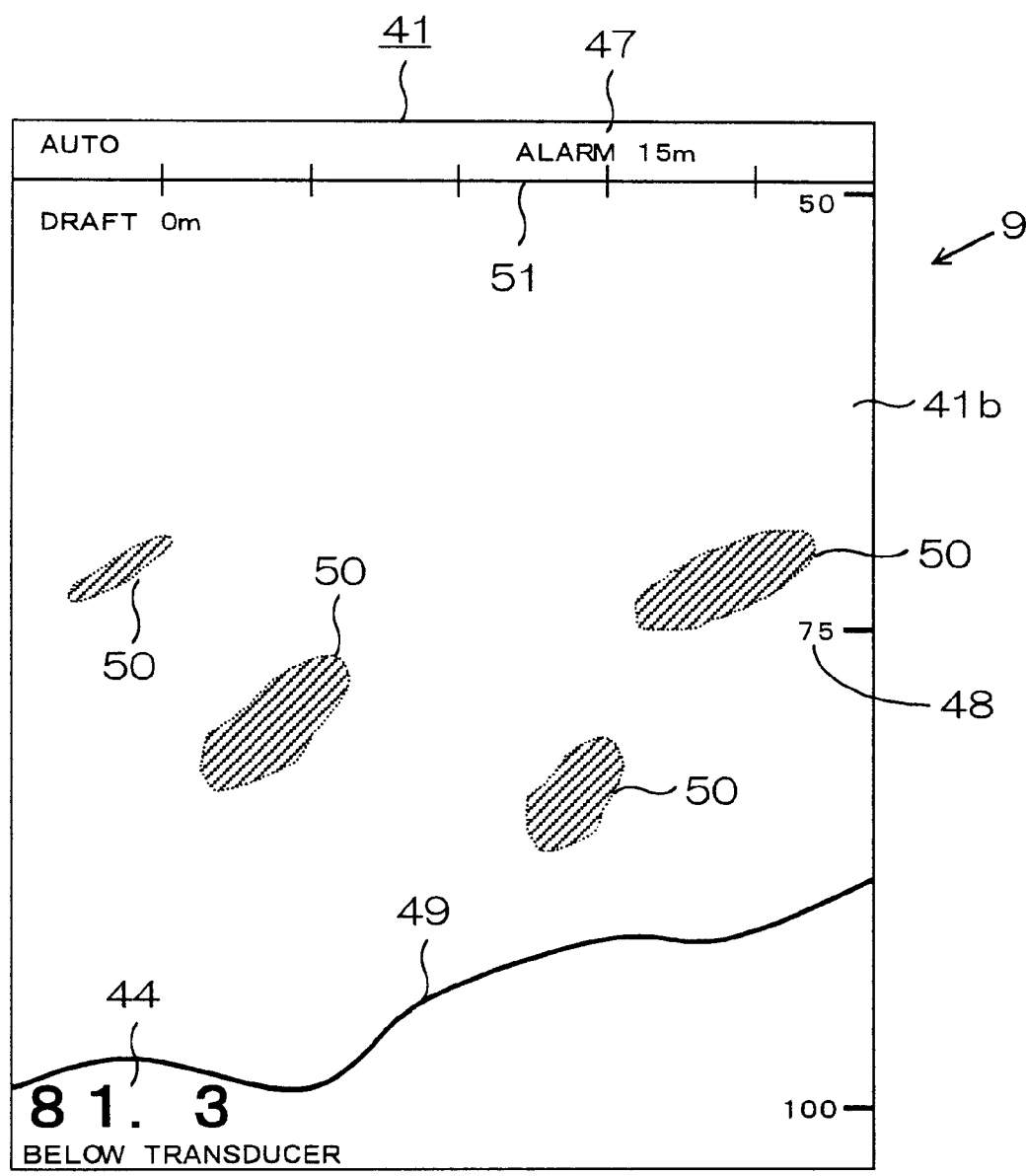
FIG. 5 is a view showing an example of a fish school display screen.

In FIG. 4, in the case where the selector switch 18 is switched to a side "a", the display instrument 9 is connected to the side of the fish detection control block 16, and a screen 41b of fish school detection information as shown in FIG. 5 is displayed on the display instrument 9. Since this screen 41b is the same as the screen 41b of FIG. 3, the same portions are designated by the same symbols and the explanation is omitted. However, in FIG. 5, since the fish school detection information can be displayed on the whole area of the screen, the display area is naturally wider than that of FIG. 3, and a larger amount of fish school information can be displayed.

Figure 6:
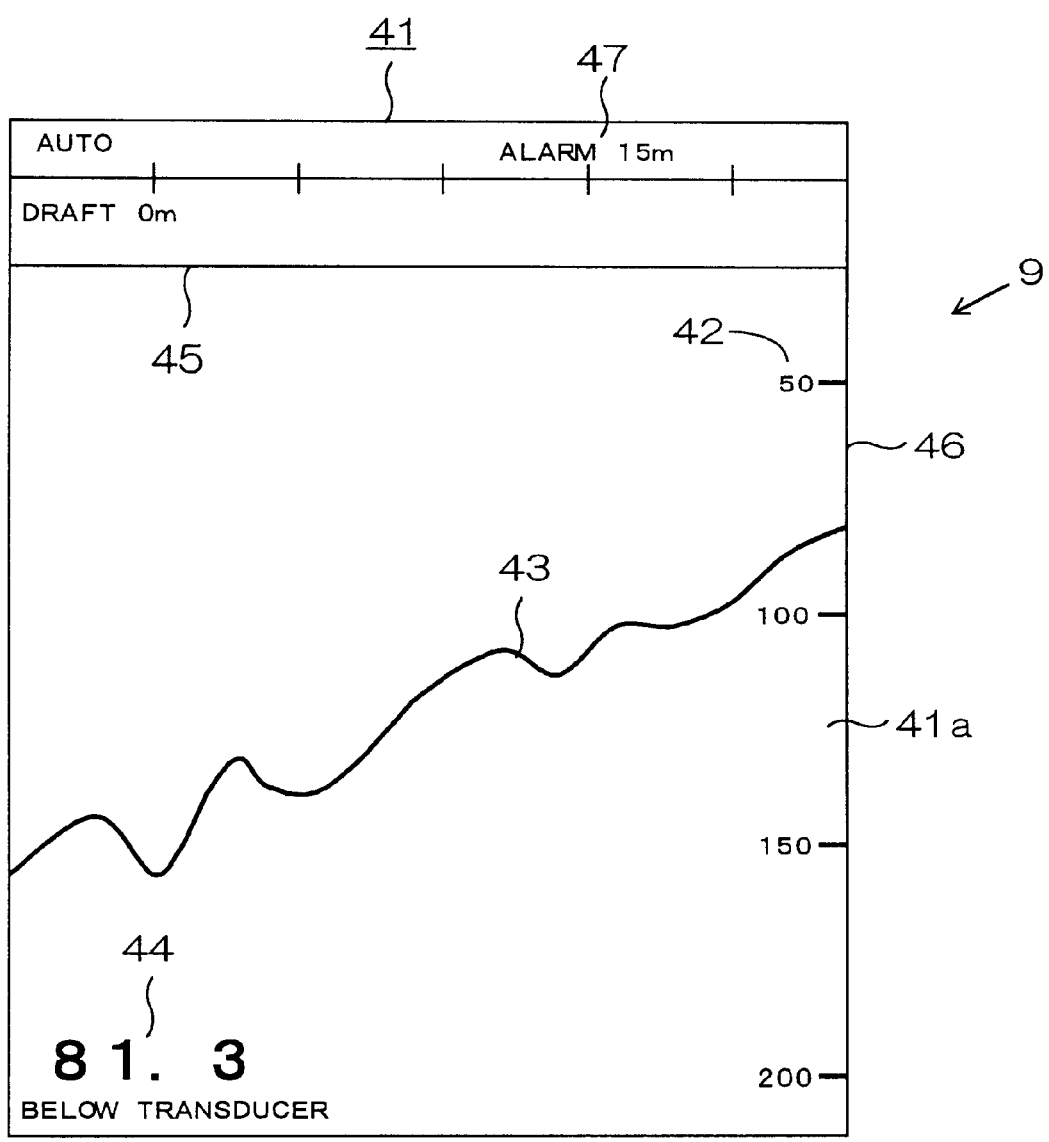
FIG. 6 is a view showing an example of a water depth display screen.

Besides, in FIG. 4, in the case where the selector switch 18 is switched to a side "b", the display instrument 9 is connected to the side of the depth measurement control block 17, and a screen 41a of water depth information as shown in FIG. 6 is displayed on the display instrument 9. Since this screen 41a is also the same as the screen 41a of FIG. 3, the same portions are designated by the same symbols and the explanation is omitted. Besides, also in this case, since the water depth information can be displayed on the whole area of the screen, the display area becomes wide and the water depth history for a longer time can be displayed.

In this way, by switching the screen 41a of the water depth information and the screen 41b of the fish school detection information to display one of them on the display instrument 9, it is possible to select necessary information and to display it in detail, and it is possible to display a large amount of information efficiently on the limited screen.

Figures 7A, 7B:
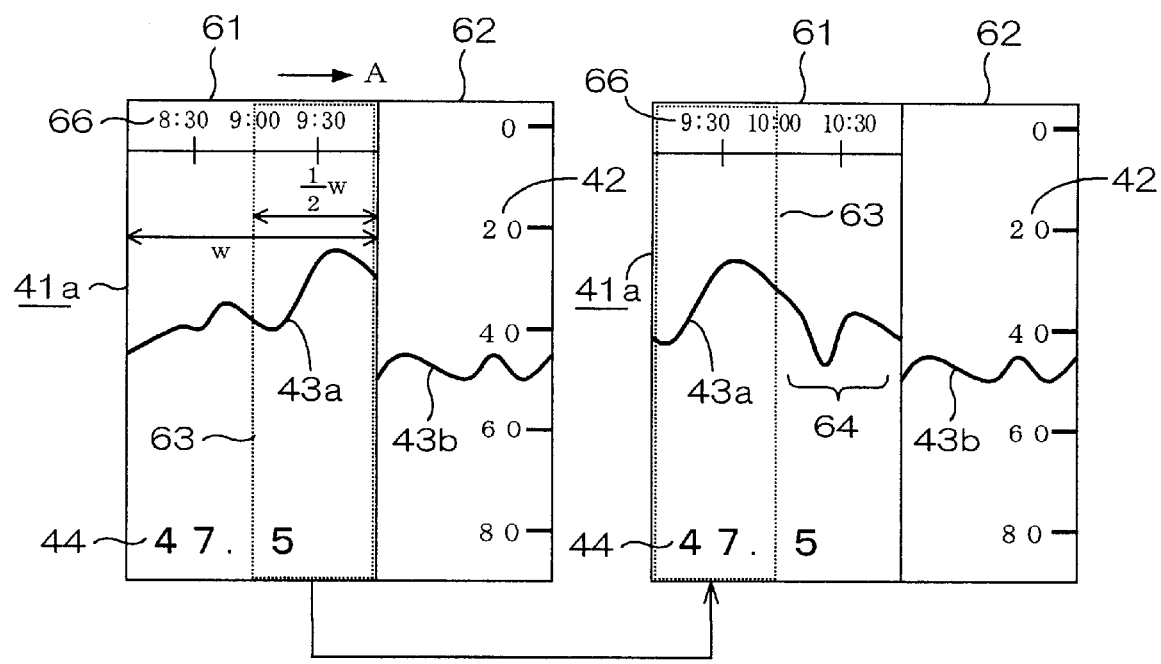
FIGS. 7A and 7B are views showing an example of a display screen renewed by scroll.

By the way, in FIG. 2, when the mode switch 31 is set to the HISTORY mode, a screen as shown in FIG. 7A is displayed. In the HISTORY mode, the display screen 41a is divided in two, and a screen 61 on which water depth information over the past 24 hours is historically displayed and a screen 62 on which water depth information for the latest 5 minutes including the present measured depth (in this example, 47.5 m) is historically displayed are displayed. Reference numerals 43a and 43b designate seabed lines, and with respect to the seabed line 43a of the screen 61, only the contour line is displayed. On the other hand, with respect to the seabed line 43b of the screen 62, a geological portion is displayed in, for example, a form painted by red. Incidentally, reference numeral 42 designates a water depth scale; and 44, a present water depth value.

The screen 61 can be scrolled in the right and left directions, and by this, the change of the seabed line 43a for the past 24 hours can be traced. That is, when the plus key 28 of FIG. 2 is pressed, the screen 61 is scrolled forward (direction of arrow A), and when the minus key 27 is pressed, the screen 61 is scrolled backward.

In this case, when the screen is renewed by the scroll operation, if data is renewed one by one, it takes a very long time to renew. On the other hand, when one page of the screen 61 is renewed, although a time for renewal can be shortened, there is a problem that the connection of data is hard to understand and the history of change of the seabed line 43a can not be accurately grasped, since data before the renewal disappears from the screen 61.

Then, in this embodiment, display contents are renewed by scroll in an area unit of ½ of all display area. That is, in FIG. 7A, in the case where the width of all display area is made w, by pressing the plus key 28 once, the screen 61 is scrolled in the direction of the arrow A, and a display area 63 of a width of w/2 on the right half of the screen 61 is moved to the left half of the screen 61 as shown in FIG. 7B.

Then, a new seabed line 64 is displayed on the right half of the screen 61. The case where scroll is made in the direction reverse to the arrow A by the minus key 27 is also the same, and when the key 27 is pressed once, the left half of the screen 61 is moved to the right half and renewal is made. Incidentally, reference numeral 66 designates a time indication, and the time positioned in the direction of the arrow A is new.

Like this, by renewing the screen 61 every ½ screen, since the half of the screen before the renewal is displayed on the screen after the renewal, the connection of data becomes easy to understand, and the history of the change of the seabed line 43a can be easily grasped. Besides, as compared with the case where data is renewed one by one, the renewal speed can be raised. Incidentally, in this example, although renewal is made in a unit of ½ of all display area, restriction is not made to this, but in general, renewal can be made in a unit of 1/n, and renewal can be made in an arbitrary unit of ⅓, ¼ or the like.

Figure 8:
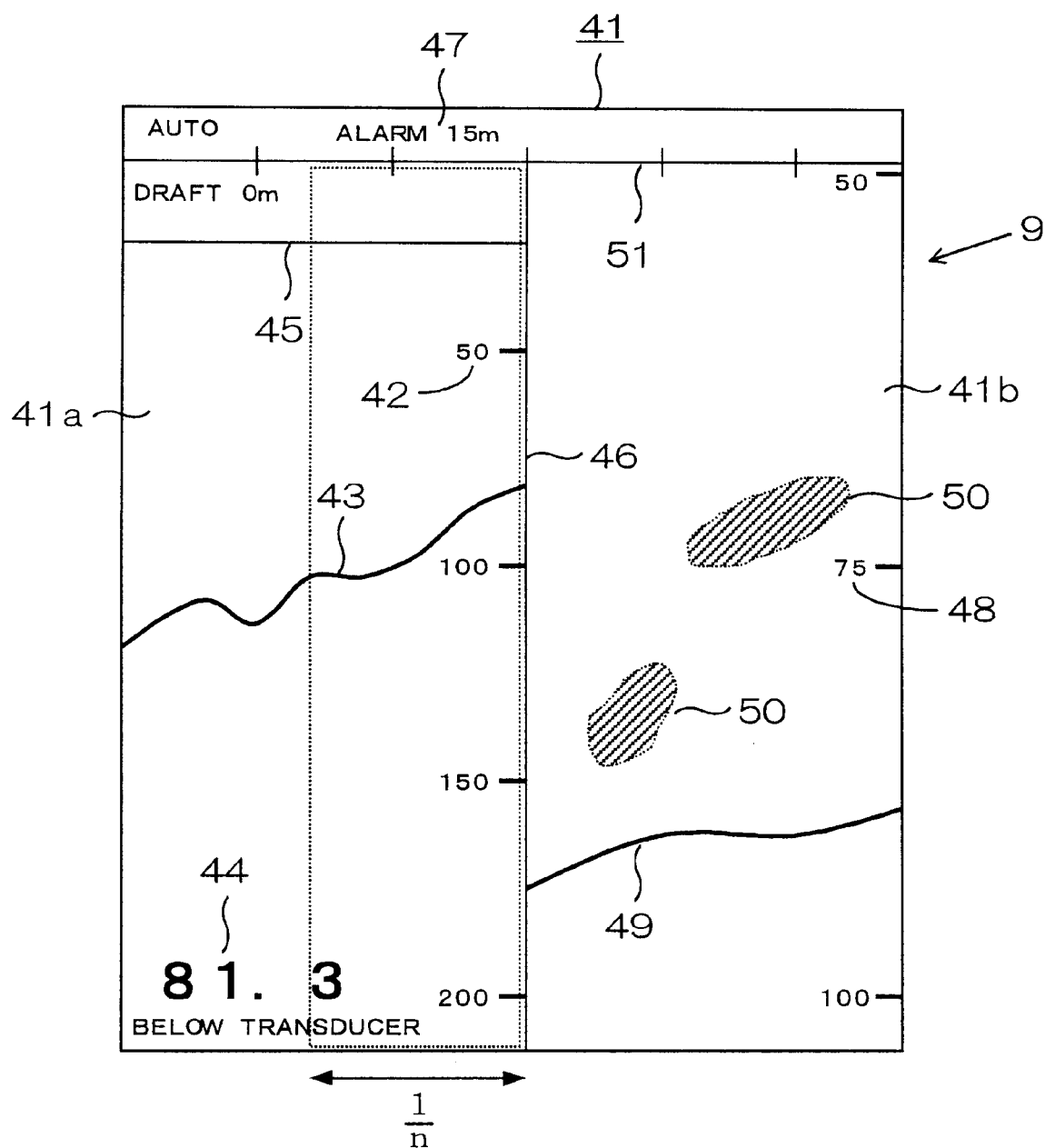
FIG. 8 is a view showing another example of a display screen renewed by scroll.

The foregoing scroll system can also be adopted in the water depth display screen in the case where the screen of the fish school and the screen of the water depth as in FIG. 3 are displayed side by side. FIG. 8 shows an example of this case, and the same portions as those of FIG. 3 are designated by the same symbols. The screen 41a on which the water depth information is displayed is renewed in an area unit of 1/n of all display area by pressing the plus key 28 or the minus key 27 once. The scroll system can be applied to not only the case where the screen of the fish school and the screen of the water depth as in FIG. 3 are displayed side by side, but also the case where the water depth display screen 41a as in FIG. 6 is displayed alone.

Figure 9:
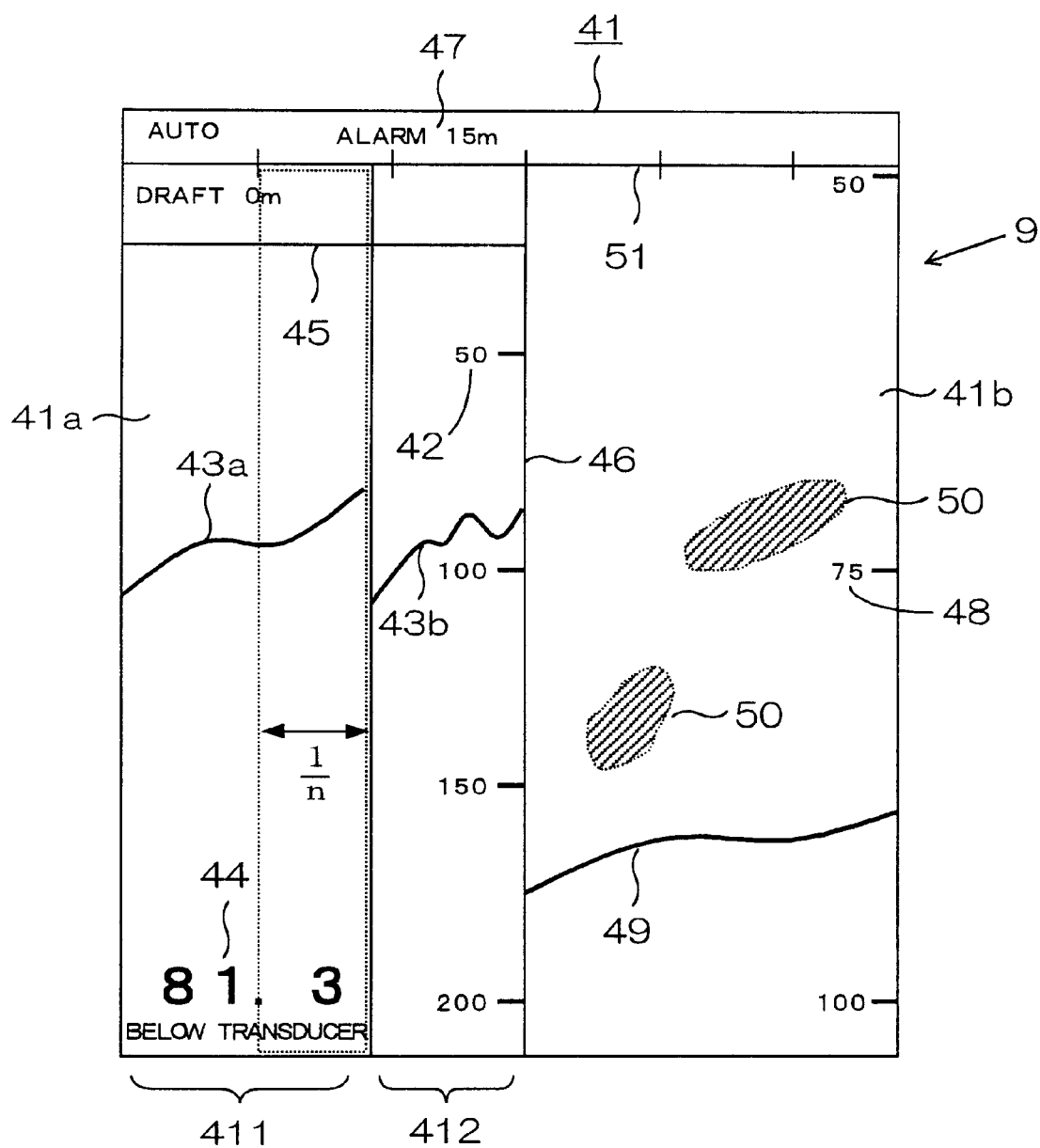
FIG. 9 is a view showing another example of a display screen renewed by scroll.

FIG. 9 shows still another embodiment of the scroll system. Here, in the two screens 41a and 41b in FIG. 8, the display screen 41a of the water depth information is divided in two similarly to FIGS. 7A and 7B, so that three screens 411, 412 and 41b are displayed on the screen 41. The water depth information for the past 24 hours is displayed on the screen 411, and the water depth information for the latest 5 minutes including the present measurement water depth (in this example, 81.3 m) is historically displayed on the screen 412. The screen 411 is designed such that the display contents are renewed by scroll in an area unit of 1/n of all display area similarly to the above.

As described above, even in the case where the display screen 41 is divided in two or three so that the display region becomes narrow, since the display contents are renewed in a unit of 1/n of a display area, the connection of data can be maintained, so that the screen becomes easy to see.

Next, switching of a frequency of an ultrasonic signal will be described. In a conventional depth measuring apparatus, one of a transducer for a high frequency and a transducer for a low frequency is used to measure the depth. However, since the high frequency has a short wavelength and a large amount of attenuation, it is hard to reach a deep place in the water and the depth of deep waters can not be measured. On the other hand, since the low frequency has a long wavelength and a small amount of attenuation, it reaches a deep place in the water, but shallow waters can not be measured with accuracy. Besides, when the low frequency is used, ultrasonic transmission is obstructed by bubbles near the water surface generated after a ship has passed, that is, a so-called bubble cut phenomenon is apt to occur, so that there is a case where accurate depth measurement becomes impossible.

In order to solve such a disadvantage, in this embodiment, as described above, the transducer 1 of FIG. 1 is constituted by the transducer 1a for the high frequency and the transducer 1b for the low frequency. Then, the frequency of an ultrasonic wave is automatically changed in accordance with the depth, so that in shallow waters where the water depth is less than, for example, 30 m, an ultrasonic signal of the high frequency (200 KHz) is emitted from the transducer 1a, and in deep waters where the water depth is 30 m or more, an ultrasonic signal of the low frequency (50 KHz) is emitted from the transducer 1b. This switching is performed by the switching portion 2. Incidentally, the range where depth measurement can be made is, for example, 2 m to 200 m.

In this way, when the two frequencies are used so that the shallow waters are measured with the high frequency and the deep waters are measured with the low frequency. For the shallow waters, the depth measurement can be accurately made without receiving the influence of the bubble cut, and for the deep waters, the depth measurement can be made to a deeper place with the low frequency. Thus, in either event, measurement results are clearly displayed on the display screen 41.

FIGS. 10A and 10B show the water depth information display screen 41a of the display instrument 9 in the case where the frequency is changed in the manner as described above. FIG. 10A shows a screen in the case where depth measurement is made with the high frequency (200 KHz), and FIG. 10B shows a screen in the case where depth measurement is made with the low frequency (50 KHz). In the drawings, the same portions as those of FIG. 6 are designated by the same symbols and the explanation is omitted. Incidentally, reference numeral 65 designates a frequency indication. FIG. 10A shows the screen of shallow waters, and the range of the water depth scale 42 is in a unit of 10 m. FIG. 10B shows the screen of deep waters, and the range of the water depth scale 42 is in a unit of 50 m. In the case where the frequency is switched from the high frequency to the low frequency, with the screen 41a being also switched from FIG. 10A to FIG. 10B, when the automatic key 25 (FIG. 2) is operated to set the AUTO mode, the range of the water depth scale 42 is automatically switched so that the seabed line 43 is displayed on the screen 41a without fail. On the other hand, in the case where the manual mode is set, the range of the water depth scale 42 is switched by the range switch 29.

Figure 11:
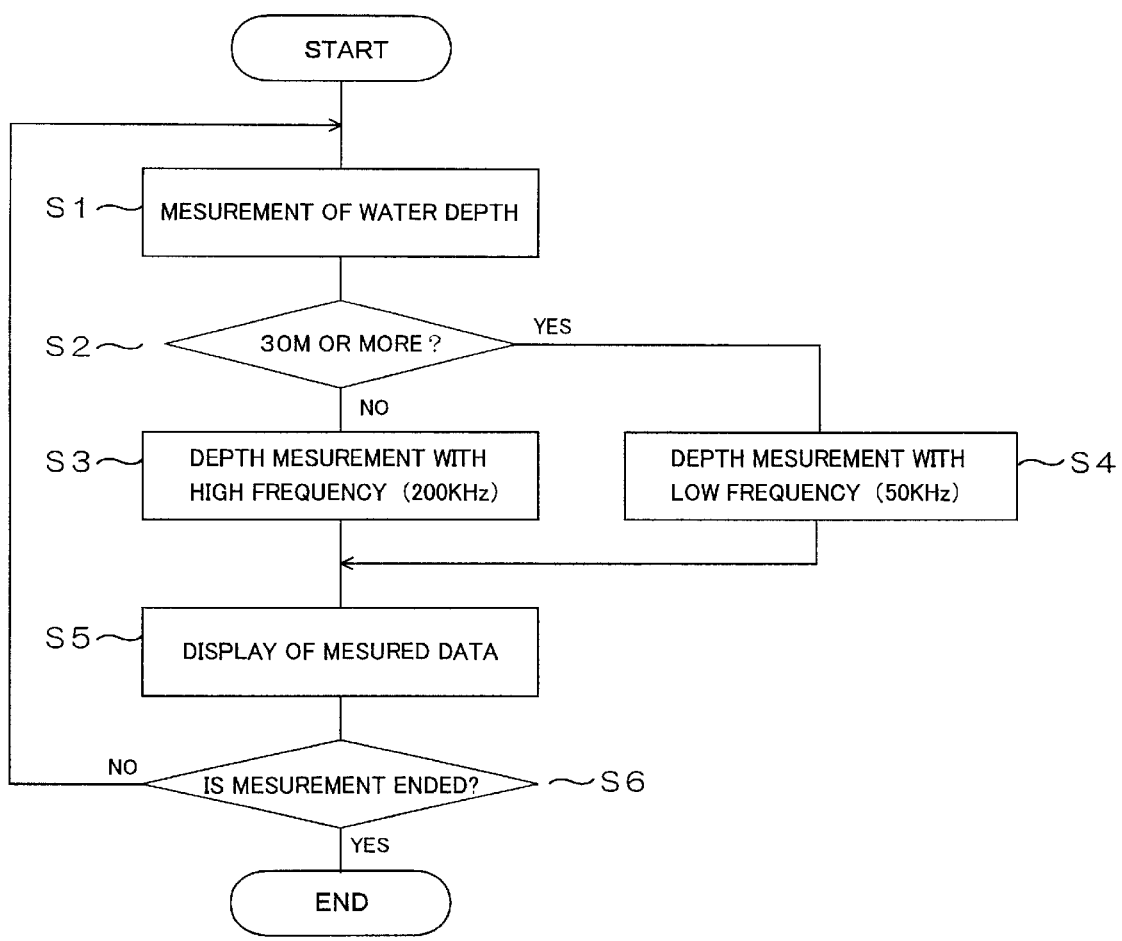
FIG. 11 is a flowchart in the case where shallow waters and deep waters are measured through frequency switching.

FIG. 11 is a flowchart in the case where shallow waters and deep waters are measured through the foregoing frequency switching. First, the transducer 1 sends the ultrasonic wave to measure the water depth (step S1). The high frequency is used as the frequency of the ultrasonic wave at this time. Incidentally, the high frequency or the low frequency can be selected as the ultrasonic wave sent from the transducer 1 with the screen (not shown) of the MENU mode.

Next, it is judged whether the measured depth is 30 m or more (step S2). This value of 30 m can be changed to an arbitrary value by setting. If it is less than 30 m (NO at step S2), a measurement place is shallow waters, so that the transducer 1a sends the ultrasonic wave of the high frequency (200 KHz) to measure the depth (step S3), and displays the results on the display instrument 9 as in FIG. 10A described before (step S5). If the depth is 30 m or more (YES at step S2), the measurement place is deep waters, so that the transducer 1b sends the ultrasonic wave of the low frequency (50 KHz) to measure the depth (step S4), and the results are displayed on the display instrument 9 as in FIG. 10B (step S5). Then it is judged whether the measurement is ended (step S6), and if the measurement is not ended (NO at step S6), the procedure returns to step S1 and the foregoing operation is repeated, and if the measurement is ended (YES at step S6), the operation is ended.

Figure 12:
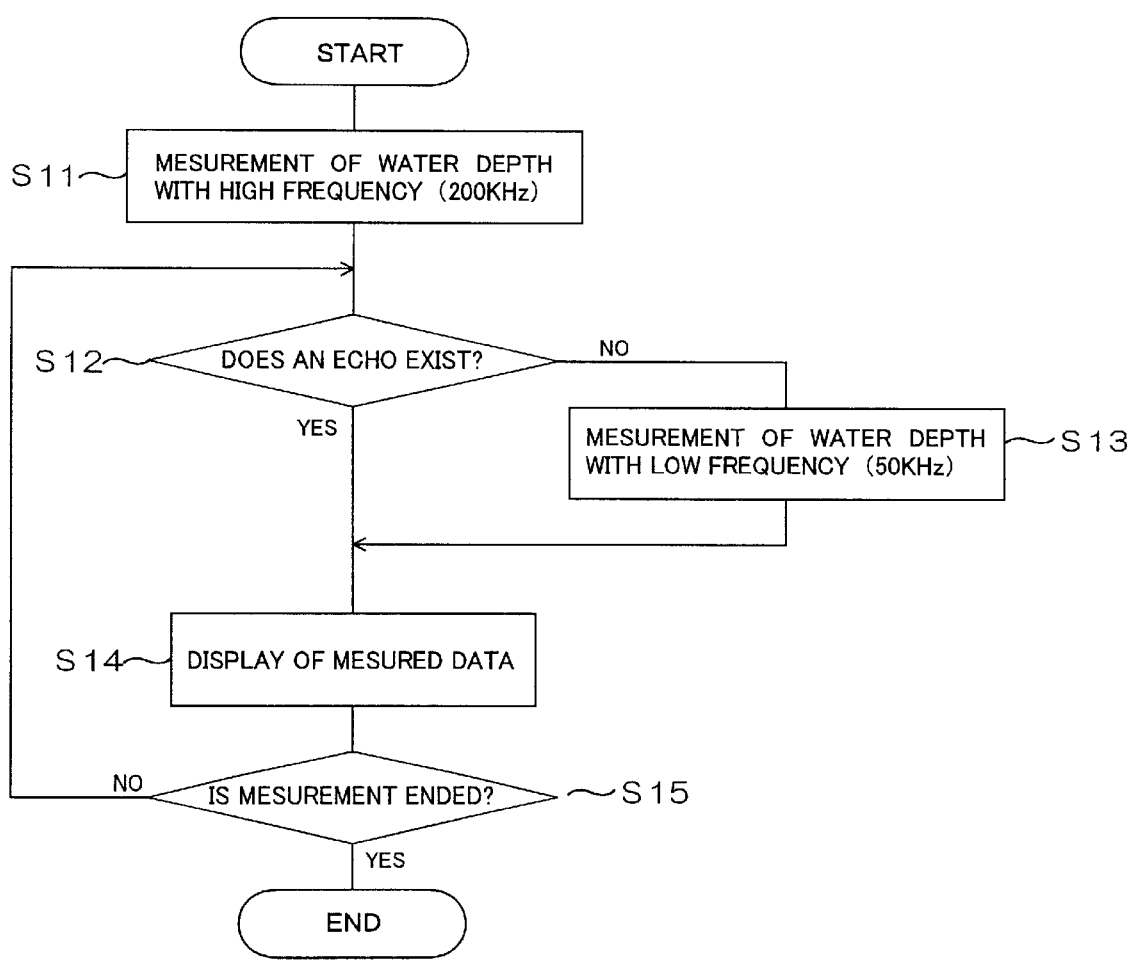
FIG. 12 is a flowchart showing another embodiment.

FIG. 12 is a flowchart showing another embodiment in the case where shallow waters and deep waters are measured through frequency switching. In this embodiment, priority is given to the high frequency when depth measurement is made, and at the point when the measurement with the high frequency becomes impossible, switching is automatically made to the low frequency. First, the transducer 1a sends the high frequency (200 KHz) to measure the water depth (step S11). Then it is judged whether an echo signal is received by the receiving circuit 4 (step S12). If the echo signal is received (YES at step S12), measurement data based on that are displayed on the display instrument 9 as in FIG. 10A (step S14). Then it is judged whether the measurement is ended (step S15). If the measurement is not ended (NO at step S15), the procedure returns to step S12 and the depth measurement with the high frequency is continued.

If the echo signal with the high frequency carrier comes not to be received (NO at step S12), the transducer 1b sends the low frequency (50 KHz) to measure the water depth (step S13), and measurement data based on that are displayed on the display instrument 9 as in FIG. 10B (step S14). Then it is judged whether the measurement is ended or not (step S15). If the measurement is not ended (NO at step S15), the procedure returns to step 12 and the depth measurement with the low frequency is continued, and if the measurement is ended (YES at step S15), the operation is ended.

Figure 13A:
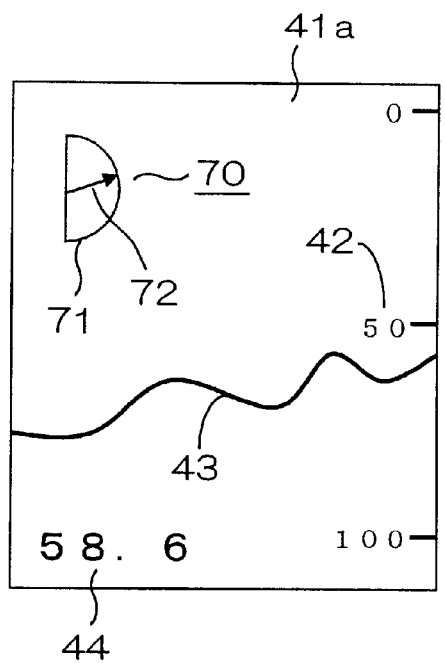
FIGS. 13A and 13B are views showing examples of a screen displaying a mark indicating the trend of an inclination of the seabed.
Figure 13B:
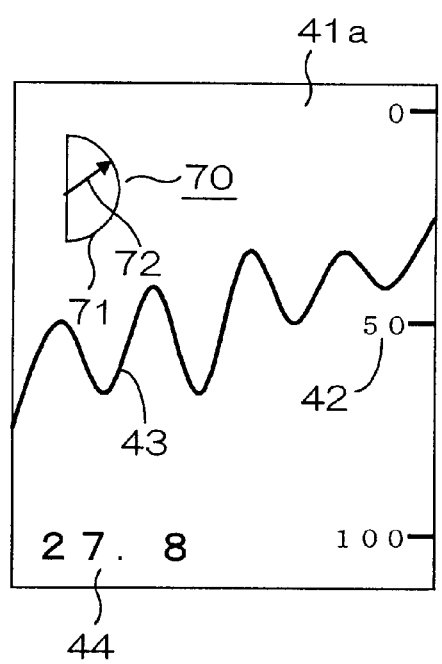

FIGS. 13A and 13B show an embodiment in which a mark 70 indicating the trend of an inclination of the seabed is displayed on the display screen 41a in addition to the water depth information. Whether the mark 70 is displayed or not can be selected through the screen of the MENU mode. In FIGS. 13A and 13B, the same portions as those of FIG. 6 are designated by the same symbols and the explanation is omitted. The mark 70 is constituted by a semicircle 71 and an arrow 72 indicated in its inside, and the degree of the inclination of the arrow 72 from the horizontal indicates the trend of the average inclination of the seabed for a past time period. In the case of FIG. 13A, since the inclination of the seabed is gentle on average, the inclination of the arrow 72 is small. However, in the case of FIG. 13B, since the inclination of the seabed is steep on average, the inclination of the arrow 72 is large.

Figure 14A:
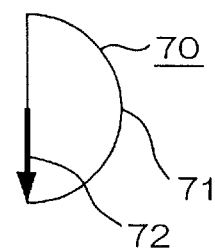
FIGS. 14A to 14G are views showing display patterns of the mark.
Figure 14B:
Figure 14C:
Figure 14D:
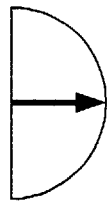
Figure 14E:
Figure 14F:
Figure 14G:

FIGS. 14A through 14G are views showing display patterns of the mark 70. FIG. 14A shows an indication of a case where an average inclination angle $\theta$ is $-90° \leq \theta < -60°$; FIG. 14B shows an indication of a case of $-60° \leq \theta < -30°$; FIG. 14C shows an indication of a case of $-30° \leq \theta < -1°$; FIG. 14D shows an indication of a case of $-1° \leq \theta \leq 1°$; FIG. 14E shows an indication of a case of $1° < \theta \leq 30°$; FIG. 14F shows an indication of a case of $30° < \theta \leq 60°$; and FIG. 14G shows an indication of a case of $60° < \theta \leq 90°$.

Figure 15:
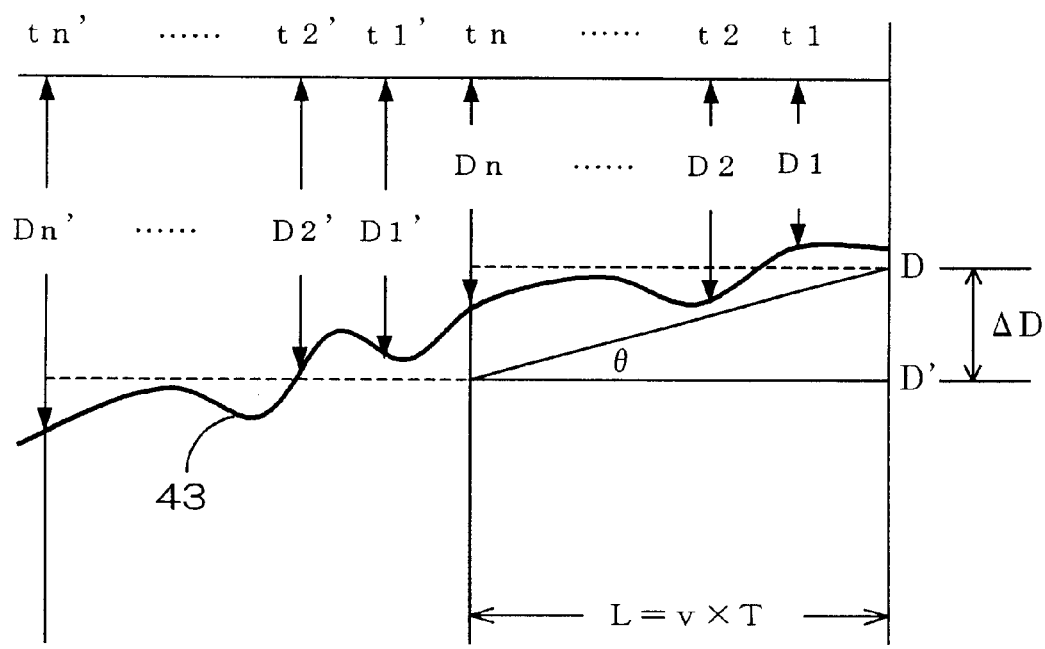
FIG. 15 is a view showing the principle for obtaining a change in water depth.

The average inclination angle $\theta$ of the seabed is obtained by calculating the changes in the water depth up to now on the basis of the past water depth data. FIG. 15 shows this principle. In FIG. 15, t1, t2, . . . tn are timings of ultrasonic detection pulses emitted from the transducer 1 for the past T minutes (for example, one minute). Water depths at respective points of time measured by the ultrasonic detection pulses are made D1, D2, Dn, respectively. Here, when the speed of a ship is v per minute, a distance L in which the ship moves for T minutes becomes L=v×T. On the other hand, an average value D of the water depth measured for T minutes becomes D=(D1+D2 . . . +Dn) /n, and an average value D' of the water depth measured similarly at the point T minutes before becomes D'=(D1'+D2' ... +Dn')/n, and a difference between the present average water depth D and the average water depth D' T minutes before becomes ΔD=D−D'. Thus, the average inclination angle θ of the seabed for T minutes can be obtained from the following expression.

$$\theta = \tan^{-1} \Delta D/L = \tan^{-1} \Delta D/(v \times T)$$

By the value of the average inclination angle θ, the patterns of the mark 70 of FIGS. 14A through 14G are determined. Incidentally, the value of T can be determined by parameters such as a speed or steering time (time from steering to a point when a ship is actually rotated).

Incidentally, in the above example, although the difference between the present average water depth D and the average water depth D' T minutes before is obtained, the water depth value Dn at the point T minutes before may be used in place of the average water depth D' T minutes before. Besides, in the above example, although the existence of display of the mark 70 is selected on the screen of the MENU mode, instead of this, the mark 70 may be automatically displayed when the measured water depth becomes a definite value or less. Besides, as the mark 70, various shapes made of symbols or figures can be used, and restriction is not made to the above example.

Thus, by displaying the mark 70 indicating the trend of the inclination of the seabed on the display screen 41a in addition to the water depth information, the change of the seabed can be easily predicted on the screen. That is, in the case of the seabed with many undulations, it is difficult to judge by only using the display of the seabed line 43 whether the seabed becomes shallow on average or becomes deep, and is also difficult even at a place where the inclination of the seabed is gentle. However, in this embodiment, since the average change of the water depth is graphically displayed by the mark 70 on the basis of the past depth measurement data, the change of the seabed can be easily predicted. Besides, a slight inclination of the seabed can also be grasped by the mark 70. Thus, an accident such as stranding can be prevented in advance.

Figure 18:
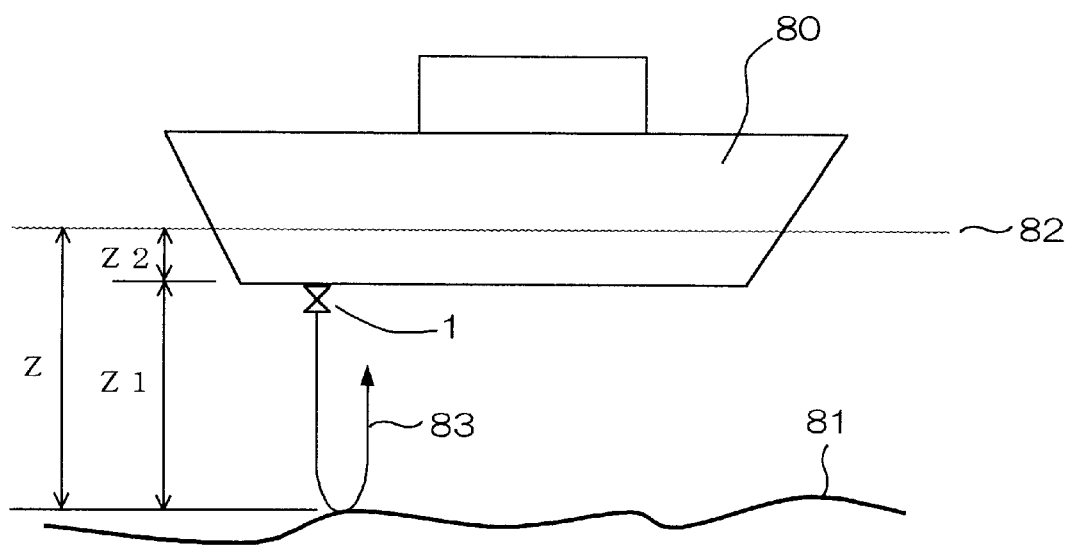
FIG. 18 is a view showing the principle of the draft correction.

Next, screen display in the case where a draft correction is made will be described. The draft correction is a correction which is necessary since a fixed position of the transducer 1 is lower than the actual water surface. FIG. 18 is a view showing the principle of the draft correction. The transducer 1 is fixed on the lower surface of a ship's hull 80, and the ship' hull 80 sinks in the water by Z2 from the water surface 82. Thus, the water depth measured with an ultrasonic wave 83 emitted from the transducer 1 is a water depth value Z1 from the bottom of the ship to the seabed, and is not an actual water depth value Z. Thus, in the case where the actual water depth value Z should be displayed in the foregoing DBS mode, it is necessary to add the draft value Z2 to the measured water depth value Z1. This correction is the draft correction.

Figure 16A:
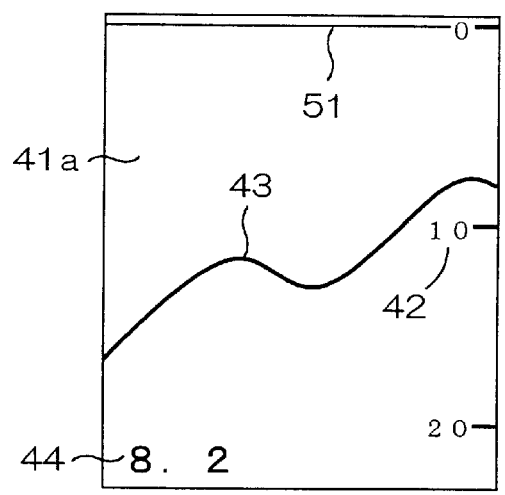
FIGS. 16A and 16B are an example of a display screen for explaining a disadvantage by a draft correction.
Figure 16B:
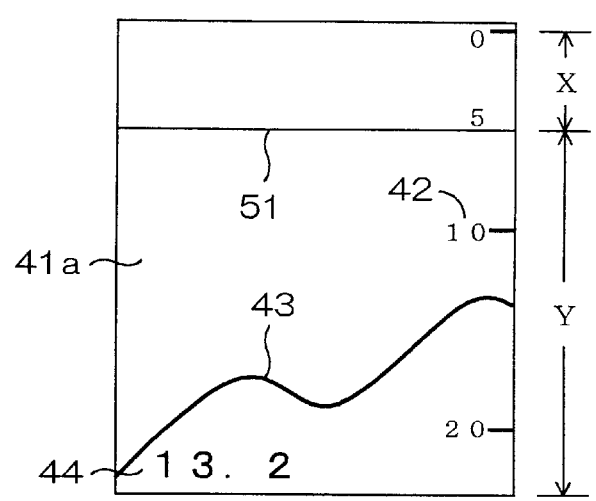

By the way, when such draft correction is carried out by a conventional apparatus, there occurs a disadvantage that an oscillation line is shifted downward on the display screen and the display region of data will be narrower. This will be explained with reference to FIGS. 16A and 16B. FIG. 16A shows a screen in the case where a draft value is 0 and an oscillation line 51 is positioned at 0 of the water depth scale 42. In this case, the water depth information is displayed on the whole region of the screen 41a. On the other hand, FIG. 16B is a screen in the case where the draft value is set to 5 m, and the oscillation line 51 is shifted by X to the position of 5 m of the water depth scale 42. Thus, a display region Y of the water depth information will be narrower. As the draft value becomes large, the oscillation line 51 shifts downward and the display region Y becomes further narrow.

While, in IMO (International Maritime Organization) standards as international standards, in the case of a 20 m range, it is obliged to display a screen with 5 mm or more per a water depth of 1 m, in other words, it is required to secure 5 mm×20=100 mm for a vertical size of the display region Y. However, since the screen 41a is a small screen as described above and the size is limited, when the oscillation line 51 is shifted downward and the display region Y becomes narrow as set forth above, it becomes impossible to satisfy the IMO standards. Especially in the case of a shallow range, since the amount of shift of the oscillation line 51 is large, the display region Y is greatly decreased, and a part of the seabed line 43 disappears from the screen and becomes hard to see. On the other hand, since anything is not displayed on a portion above the oscillation line 51, this portion results in a useless region.

Figure 17A:
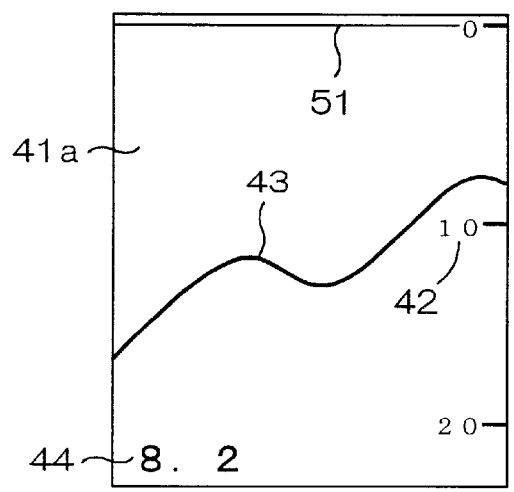
FIGS. 17A and 17B are an example of a display screen of a draft correction of the present invention.
Figure 17B:
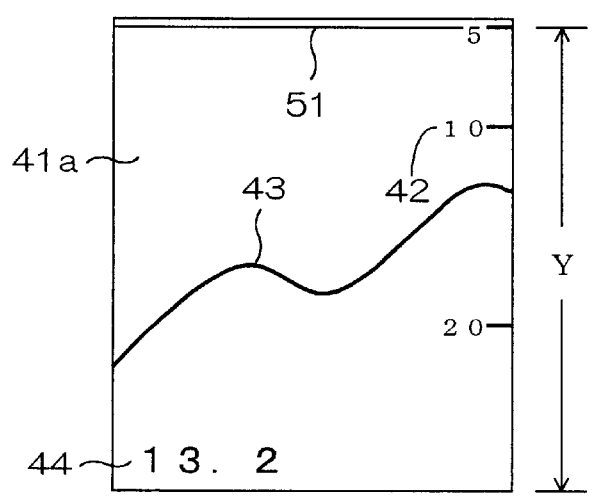

Then, in this embodiment, when the draft value is set, the oscillation line is not moved but the water depth scale is shifted upward, so that the above disadvantage will be overcome. FIGS. 17A and 17B show a screen for explaining this case. FIG. 17A shows the screen for the case where the draft value is 0, and the oscillation line 51 is positioned at 0 of the water depth scale 42. This screen is the same as the screen of FIG. 16A, and the water depth information is displayed on the whole region of the screen 41a. On the other hand, FIG. 17B shows the screen in the case where the draft value is set to 5 m, and the position of the oscillation line 51 is not changed as compared with FIG. 17A. The water depth scale 42 is shifted upward by 5 m. Thus, the display region Y does not become narrow, and the same display region as the case of FIG. 17A is secured.

Incidentally, in order to perform the draft correction, the mode switch 31 in FIG. 2 is made the DBS mode, and the draft key 21 is operated. When the draft key 21 is pressed, a not-shown draft value set screen is displayed. The draft value is initialized on this screen, and the plus key 28 or the minus key 27 is pressed to renew the set value, so that setting of the draft value is performed on the screen. The draft value setting can be made also on the fish school display screen 41b.

In this way, by shifting the water depth scale upward, the size of the display region Y will be constant and broad, and it will become possible to satisfy the IMO standards. Besides, since a wasteful region is not produced on the screen and the display region Y does not change even in the case of a shallow range, it does not become hard to see. Thus, information can be efficiently displayed on the small display screen 41a.

Figure 19:
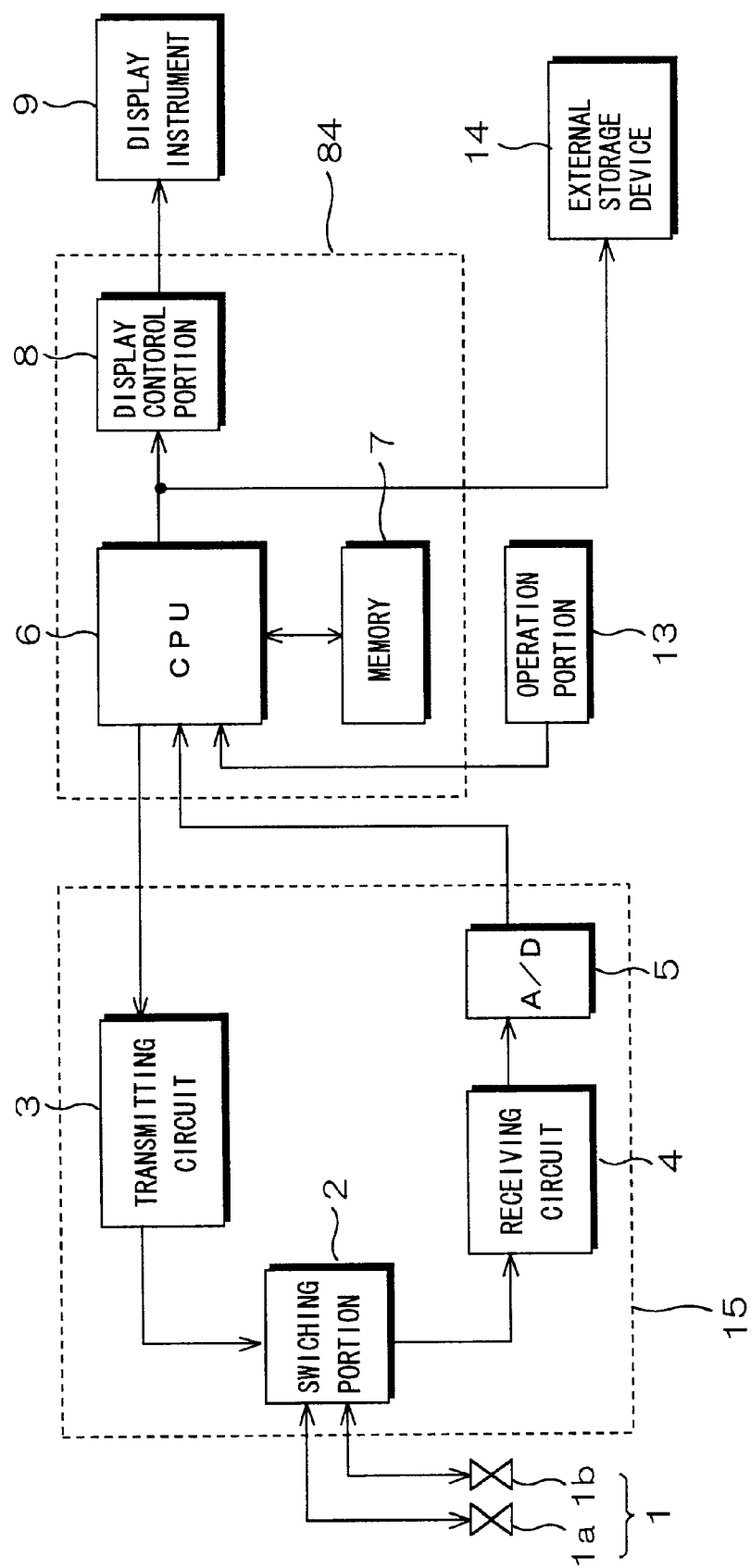
FIG. 19 is a block diagram of an underwater detecting apparatus according to another embodiment of the present invention.

FIG. 19 is a block diagram of an underwater detecting apparatus according to another embodiment of the present invention, which is a modified example of the embodiment of FIG. 1. In FIG. 19, the same portions as those of FIG. 1 are designated by the same symbols and the explanation is omitted. In FIG. 19, the fish detection control block 16 and the depth measurement control block 17 in FIG. 1 are integrated to make a fish detection and depth measurement control block 84. That is, the CPU 6 is made to have the function of the CPU 10 in the depth measurement control block 17 as well, the memory 7 is made to have the function of the memory 11 as well, and the display control portion 8 is made to have the function of the display control portion 12 as well. As a result, the circuits can be simplified.

The operation of FIG. 19 is basically the same as that of FIG. 1. A transmission signal is outputted from the transmitting circuit 3 on the basis of a transmission instruction from the CPU 6, and an ultrasonic wave is sent from the transducer 1. An echo signal reflected by a school of fish or the seabed is received by the transducer 1, and is supplied to the CPU 6 through the receiving circuit 4 and the A/D converter 5. The CPU 6 calculates fish school detection information based on the echo signal, and at the same time, the CPU holds the peak of the echo signal or performs an averaging processing to calculate a water depth to the seabed, and stores the respective calculation results in the memory 7. The display control portion 8 outputs data read out from the memory 7 to the display instrument 9, and the fish school detection information and the water depth information are displayed side by side on the display instrument 9 as shown in FIG. 3.

Figure 20:
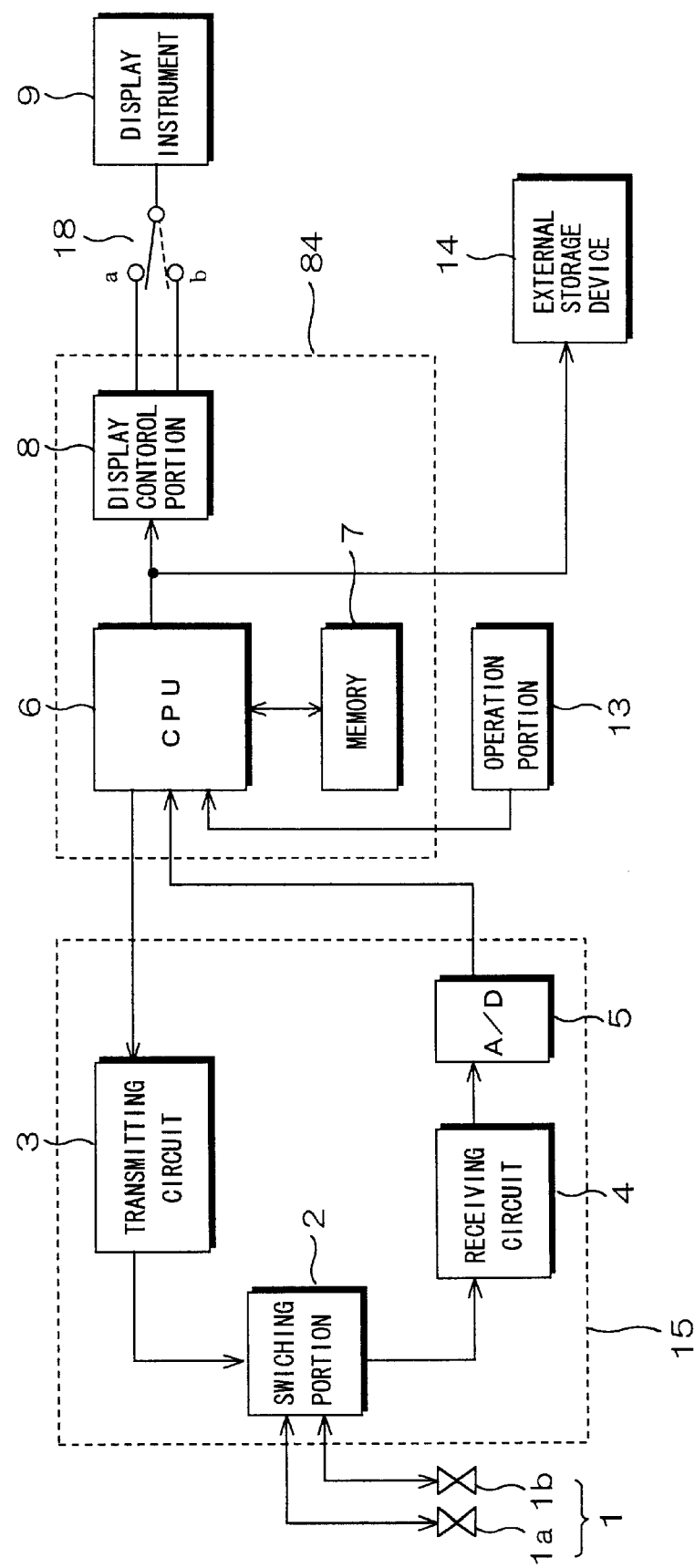
FIG. 20 is a block diagram of an underwater detecting apparatus according to another embodiment of the present invention.

FIG. 20 is a block diagram showing another embodiment of an underwater detecting apparatus of the present invention, which is a modified example of the embodiment of FIG. 4. In FIG. 20, the same portions as those of FIG. 4 are designated by the same symbols and the explanation is omitted. Also in FIG. 20, similar to FIG. 19, the fish detection control block 16 and the depth measurement control block 17 in FIG. 4 are integrated to make a fish detection and depth measurement control block 84. The CPU 6 is made to have the function of the CPU 10 in the depth measurement control block 17 as well, the memory 7 is made to have the function of the memory 11 as well, and the display control portion 8 is made to have the function of the display control portion 12 as well. With this construction, the circuits can be simplified.

The operation of FIG. 20 is basically the same as with FIG. 4. A transmission signal is outputted from the transmitting circuit 3 based on a transmission instruction from the CPU 6, and an ultrasonic wave is sent from the transducer 1. An echo signal reflected by a school of fish or the seabed is received by the transducer 1, and is provided to the CPU 6 through the receiving circuit 4 and the A/D converter 5. The CPU 6 calculates fish school detection information on the basis of the echo signal, and at the same time, the CPU holds the peak of the echo signal or performs an averaging processing to calculate a water depth to the seabed, and stores the respective calculation results in the memory 7.

In the case where the selector switch 18 is switched to the side "a", the display control portion 8 reads out the fish school detection information from the memory 7 and output it to the display instrument 9, and the fish school detection information is displayed on one screen 41 of the display instrument 9 as shown in FIG. 5. In the case where the selector switch 18 is switched to the side "b", the display control portion 8 reads out the water depth information from the memory 7 and outputs it to the display instrument 9, and the water depth information is displayed on one screen 41 of the display instrument 9 as shown in FIG. 6.

Incidentally, since the water depth data for the past 24 hours are stored in the external storage device 14 of FIGS. 1, 4, 19 and 20 as described hereinbefore, it is possible to read out the stored data and to display it on the screen 41a when necessary. At this readout, it is possible to specify an arbitrary time zone and to extract only the data during that. This operation is performed by making the mode switch 31 of FIG. 2 the LOGBOOK mode and by specifying the time zone in the table displayed at this time in which times are made to correspond to water depth values.

In the above embodiments, although the underwater detecting apparatus having both functions of the fish school detecting apparatus and the depth measuring apparatus, the embodiments shown in FIGS. 7, 10 through 15 and 17 can also be applied to a single depth measuring apparatus. As the circuit structure therefor, the same as that of FIG. 19 can be used, and it can be realized by replacing the CPU 6, the memory 7 and the display control portion 8 of the fish detection and depth measurement control block 84 by those which are necessary for only the depth measurement. Besides, the display unit 20 can also be constructed as the same one shown in FIG. 2.

Besides, although the above embodiments show the example in which the display instrument 9 is comprised with the liquid crystal display, it can also be comprised with a CRT, an EL display or the like.

According to the present invention, since a large amount of underwater detection information can be displayed on a space of a limited display screen efficiently and effectively and to be easy to see, even if a display instrument is small, it becomes possible to accurately and quickly grasp necessary information.

Figure 21:
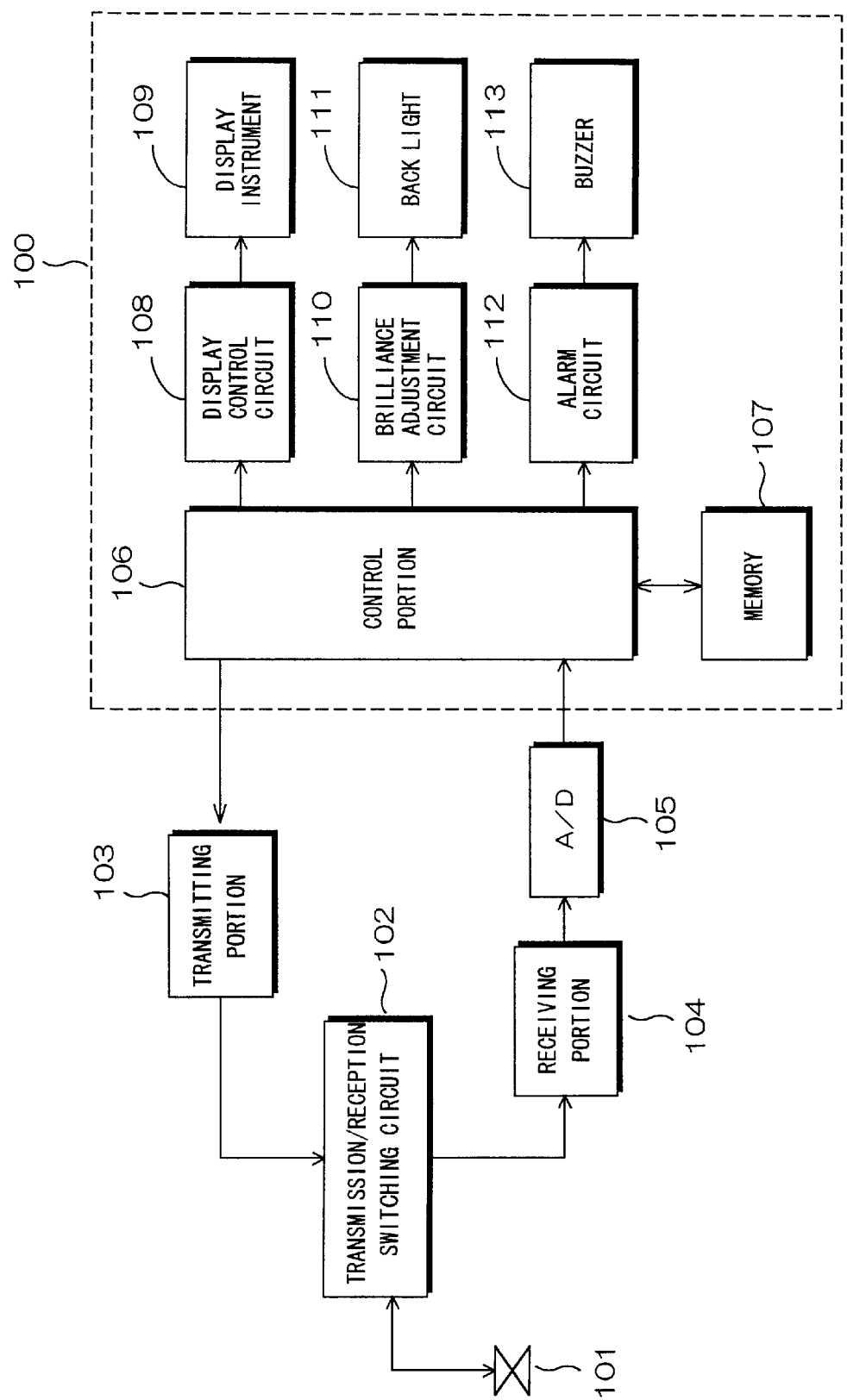
FIG. 21 is an electrical block diagram of a depth measuring apparatus of another embodiment of the present invention.

FIG. 21 is an electrical block diagram of a depth measuring apparatus according to an embodiment of the present invention. In the drawing, reference numeral 101 designates a transducer which is provided on the bottom of a ship and transmits/receives an ultrasonic wave; 102, a transmission/reception switching circuit for switching the operation of the transducer 101 to a transmission side and reception side; 103, a transmitting portion for producing a transmission signal to the transducer 101 through the transmission/reception switching circuit 102; 104, a receiving portion for receiving an echo signal from the seabed received by the transducer 101 through the transmission/reception switching circuit 102; and 105, an A/D converter for converting an analog signal received by the receiving portion 104 into a digital signal. A measurement means for measuring water depth is constituted by the transducer 101, the transmission/reception switching circuit 102, the transmitting portion 103, the receiving portion 104, the A/D converter 105, and a control portion 106 which will be explained hereinafter.

Reference numeral 106 designates a control portion including a CPU and for calculating the water depth to the seabed on the basis of output from the A/D converter 105; 107, a memory including a ROM storing a program of the CPU and a RAM storing various data; 108, a display control circuit for making the various data of the memory 107 displayed on a display instrument 109; 109, the display instrument comprised with a liquid crystal display driven by the display control circuit 108; 110, a brilliance adjustment circuit for adjusting the brilliance of a screen of the display instrument 109 on the basis of an instruction from the control portion 106; 111, a backlight whose brightness is adjusted by the brilliance adjustment circuit 110; and 112, an alarm circuit for driving a buzzer 113 as an alarm unit in response to an alarm signal from the control portion 106. A display apparatus of the present invention is constituted by the control portion 106, the memory 107, the display control circuit 108, the display instrument 109, the brilliance adjustment circuit 110, the backlight 111, the alarm circuit 112, and the buzzer 113. Incidentally, although the alarm circuit 112 and the buzzer 113 are provided to give an alarm by sound as well, they may be omitted in the case where an alarm is merely displayed on the screen of the display instrument 109.

In the depth measuring apparatus constructed as explained hereinbefore, when a transmission instruction is supplied to the transmitting portion 103 from the control portion 106, a transmission signal is outputted from the transmitting portion 103, and an ultrasonic search pulse signal is emitted in a beam form from the transducer 101 to the seabed through the transmission/reception switching circuit 102 switched to the transmission side. This ultrasonic beam is reflected by the seabed, and its echo signal is received by the transducer 101. This echo signal is received by the receiving portion 104 through the transmission/reception switching circuit 102 switched to the reception side, is converted into a digital signal by the A/D converter 105, and is supplied to the control portion 106.

The control portion 106 calculates a time from the emission of the ultrasonic search pulse signal to the reception of the echo signal, obtains the water depth to the seabed by calculation on the basis of the time measured, and stores the result in the memory 107. The display control circuit 108 outputs data read out from the memory 107 to the display instrument 109, and various data including the water depth value to the seabed are displayed on the display instrument 109.

Figure 22:
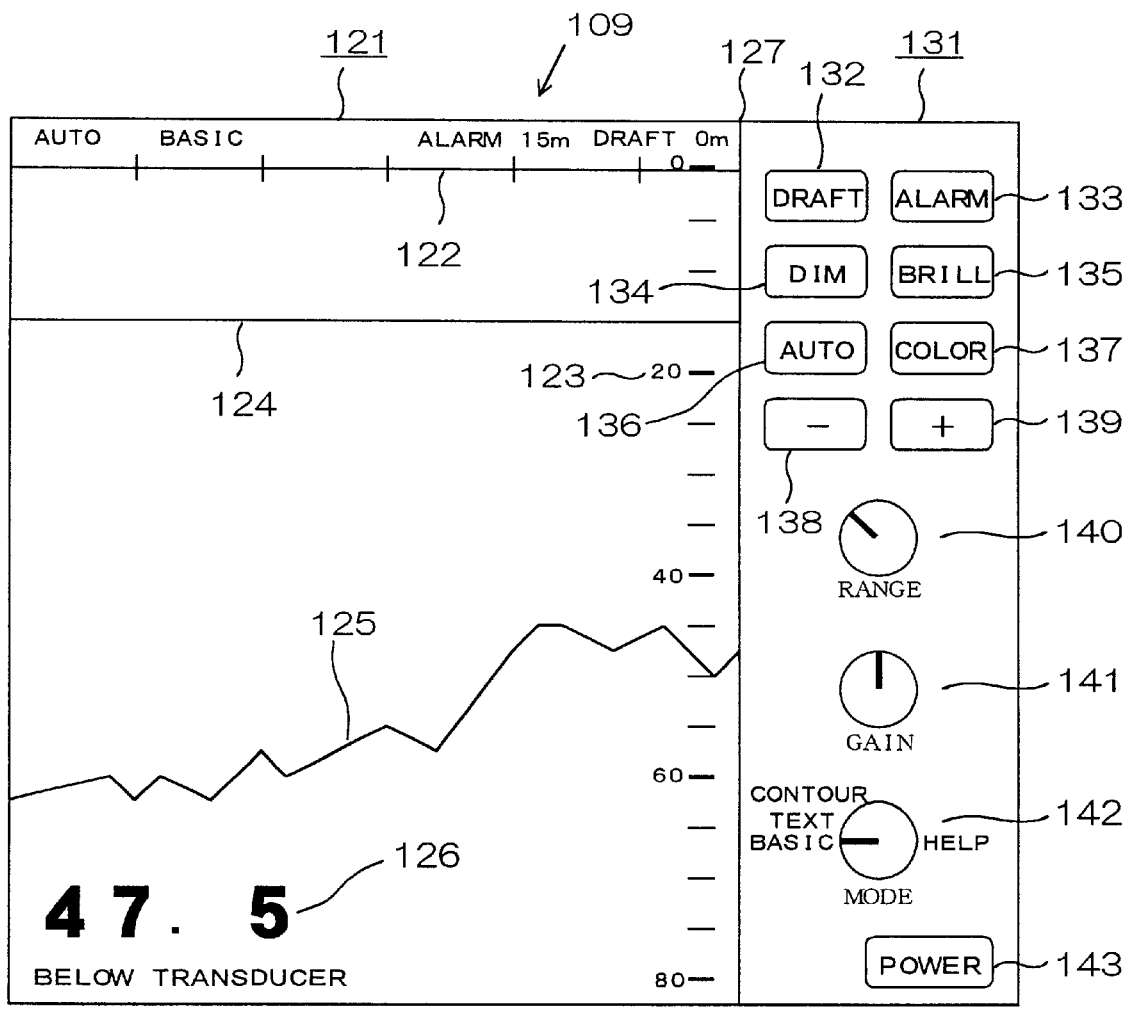
FIG. 22 is a view showing an example of a display instrument.

FIG. 22 shows an example of the display instrument 109. In the display instrument 109, an operation portion 131 is provided adjacent to a display screen 121. On the display screen 121, reference numeral 122 designates an oscillation line indicating a position of the transducer 101 on the bottom of a ship; 123, a water depth scale provided at 5 meter intervals; and 124, an alarm water depth mark as a reference to give an alarm. In this embodiment, although the alarm water depth mark 124 is indicated by a line, it may be displayed by an arrow or the like other than the line. The alarm water depth mark 124 can be set arbitrarily, and here, it is set at 15 m, and an alarm is given when the measured water depth is this one or less. Reference numeral 125 designates a seabed line displayed on the basis of water depth measurement values, and is continuously displayed as a history on the basis of data for a definite period. That is, the seabed line 125 at a position of a right end 127 of the display screen 121 is the presently measured latest seabed line, and a past seabed line measured for a past time period is displayed toward the left from this position. Reference numeral 126 designates a present water depth measurement value, and the water depth value of 47.5 m of the seabed line 125 at the end 127 is displayed.

On the other hand, in the operation portion 131, reference numeral 132 designates a draft key for setting the draft; 133, an alarm key for setting the foregoing alarm water depth mark 124; 134, an illumination adjustment key for adjusting the panel illumination of the operation portion 131; 135, a brilliance adjustment key for adjusting the brilliance of the display screen 121; 136, an automatic key for switching the automatic/manual operation of a range, sensitivity or the like; 137, a color key for adjusting the color tone of the display screen 121; 138, a minus key for renewing the display of water depth history displayed on the display screen 121 in a reverse direction (left direction) and for decreasing a set value; and 139, a plus key for renewing the display of water depth history displayed on the display screen 121 in a positive direction (right direction) and for increasing the set value.

The alarm key 133 has not only the function of setting the alarm water depth mark 124 but also the function of stopping an alarm sound and restoring the brilliance of the display screen 121 as will be described hereinafter. The brilliance adjustment key 135 adjusts the brilliance of the display screen 121 by adjusting the brightness of the backlight 111 through the brilliance adjustment circuit 110 of FIG. 21. As described hereinbefore, at the time of a night cruise, an adjustment is made such that the backlight 111 is made dark and the display screen 121 is made to have low brilliance. On the other hand, in the case where the surroundings are bright as in daylight, the display screen 121 is adjusted to normal brilliance.

Reference numeral 140 designates a range switch for switching a display range; 141, a gain switch for adjusting sensitivity; 142, a mode switch for switching a mode; and 143, a power switch of the display instrument 109. The mode includes a BASIC mode for displaying a basic screen, a TEXT mode for displaying the water depth history in a table form, a CONTOUR mode for displaying the water depth history in a graph form, a HELP mode for displaying the explanation of operations and functions, and the like.

Figure 23:
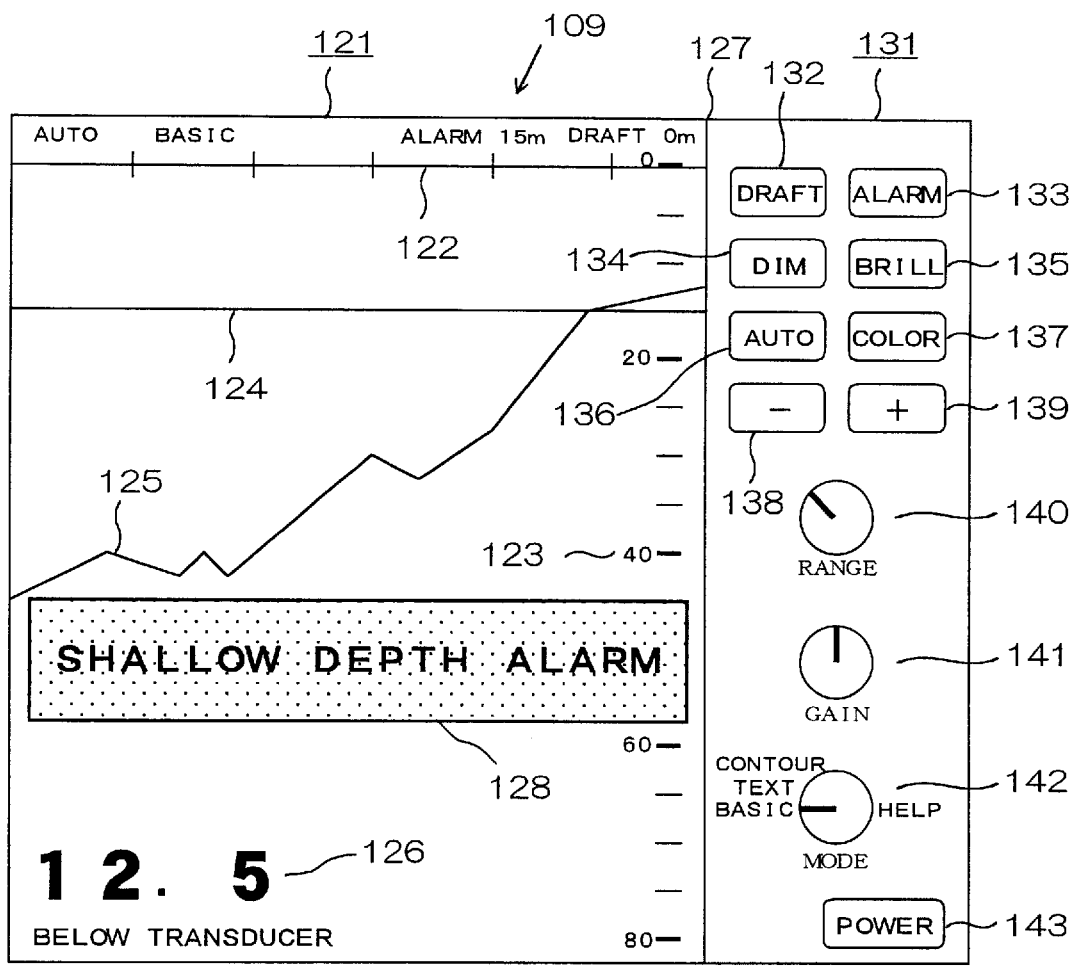
FIG. 23 is a view showing a case where an alarm is displayed on the display instrument.

With the display in FIG. 22, the present water depth value is 47.5 m, and does not reach 15 m as the set value of the alarm water depth mark 124, so that there is no fear of stranding, and therefore, an alarm is not produced. However, if the present water depth value reaches 15 m, an alarm to stranding is outputted as water depth abnormality. That is, if the calculated water depth value is 15 m or less, the control portion 106 reads out alarm data from the RAM 107 and outputs this to the display control circuit 108. Then, an alarm 128 "SHALLOW DEPTH ALARM", as shown in FIG. 23, indicating that the ship enters a shallow depth region is displayed on the display screen 121 of the display instrument 109.

At the same time as this, the control portion 106 provides the alarm circuit 112 with an alarm signal, so that the alarm circuit 112 operates to ring the buzzer 113. This ringing sound may be a continuous sound or may be an intermittent sound. Besides, instead of the buzzer 113, a bell or the like can also be used as an alarm unit. Alternatively, an electrical synthetic sound may also be used. Further, a terminal for outputting the alarm signal to the outside is provided and an equipment such as an alarm unit may be externally fitted to this terminal. If there is adopted a system in which the alarm signal is transmitted to another place in the ship by wireless, it is possible to recognize the occurrence of the alarm even at a remote place.

Besides, the control portion 106 outputs the alarm signal as set forth above, and at the same time, sends a brilliance control signal to the brilliance adjustment circuit 110. In response to this control signal, the brilliance adjustment circuit 110 makes the backlight 111 bright to change the display screen 121 into high brilliance even in the case where the display screen 121 is set at low brilliance by the brilliance adjustment key 135. With this arrangement, since the alarm 128 is displayed brightly and clearly, the contents can be instantaneously and easily grasped, and measures to prevent stranding can be quickly taken. Besides, even in the case where the alarm sound is hard to hear because of surrounding noises, the display screen is changed from low brilliance to high brilliance, so that the alarm can be given by light. Incidentally, even in the case where the display screen 121 is set at normal brilliance as in daylight, the brilliance is made higher than that to brighten the screen.

Here, the high brilliance is not necessarily required to be the maximum brilliance, but may be, for example, brilliance of about 80% of the maximum brilliance. In brief, the brilliance has only to be such that the contents of the alarm 128 can be clearly and visually recognized. However, for the purpose of arousing attention by making the change of brilliance of the screen large, it is preferable to raise the brilliance to the maximum brilliance. Besides, in addition to making high brilliance, if the display screen 121 is made to flash on and off, the attention is further aroused, and if the display screen 121 is made to flash on and off in the state of the maximum brilliance, it is further effective.

Besides, in FIG. 23, since the alarm 128 is displayed together with the alarm water depth mark 124 and the seabed line 125, it is possible to intuitively recognize that the seabed line 125 exceeds the line of the alarm water depth mark 124 (water depth value is the reference value or less), and the contents of the alarm 128 can be grasped more easily.

In order to stop the alarm sound of the buzzer 113 after the alarm contents are confirmed, the alarm key 133 is pressed once. When the alarm key 133 is pressed, the control portion 106 sends an alarm stop instruction to the alarm circuit 112, and the alarm circuit 112 stops driving of the buzzer 113 in response to the alarm stop instruction. Also, the control portion 106 sends an alarm display erase instruction to the display control circuit 108, and the alarm 128 of the display screen 121 is also erased. At the same time as this, the control portion 106 sends a brilliance return signal to the brilliance adjustment circuit 110, and the brilliance adjustment circuit 110 receives this, makes the backlight 111 dark, and restores the brilliance of the display screen 121 to the former low brilliance.

In this way, with this embodiment, since both the alarm and brilliance can be reset by pressing the alarm key 133 once, there is a merit that the operation becomes simple. However, the present invention is not necessarily limited to this method, but may be modified such that the alarm sound is stopped by pressing the alarm key 133 once and the brilliance is restored by pressing the brilliance adjustment key 135 once. Besides, instead of resetting the alarm sound and the brilliance by the key operation, it is also possible to automatically stop the alarm sound and to restore the brilliance after a predetermined time set by a built-in timer (not shown) of the control portion 16 has elapsed.

Figure 24:
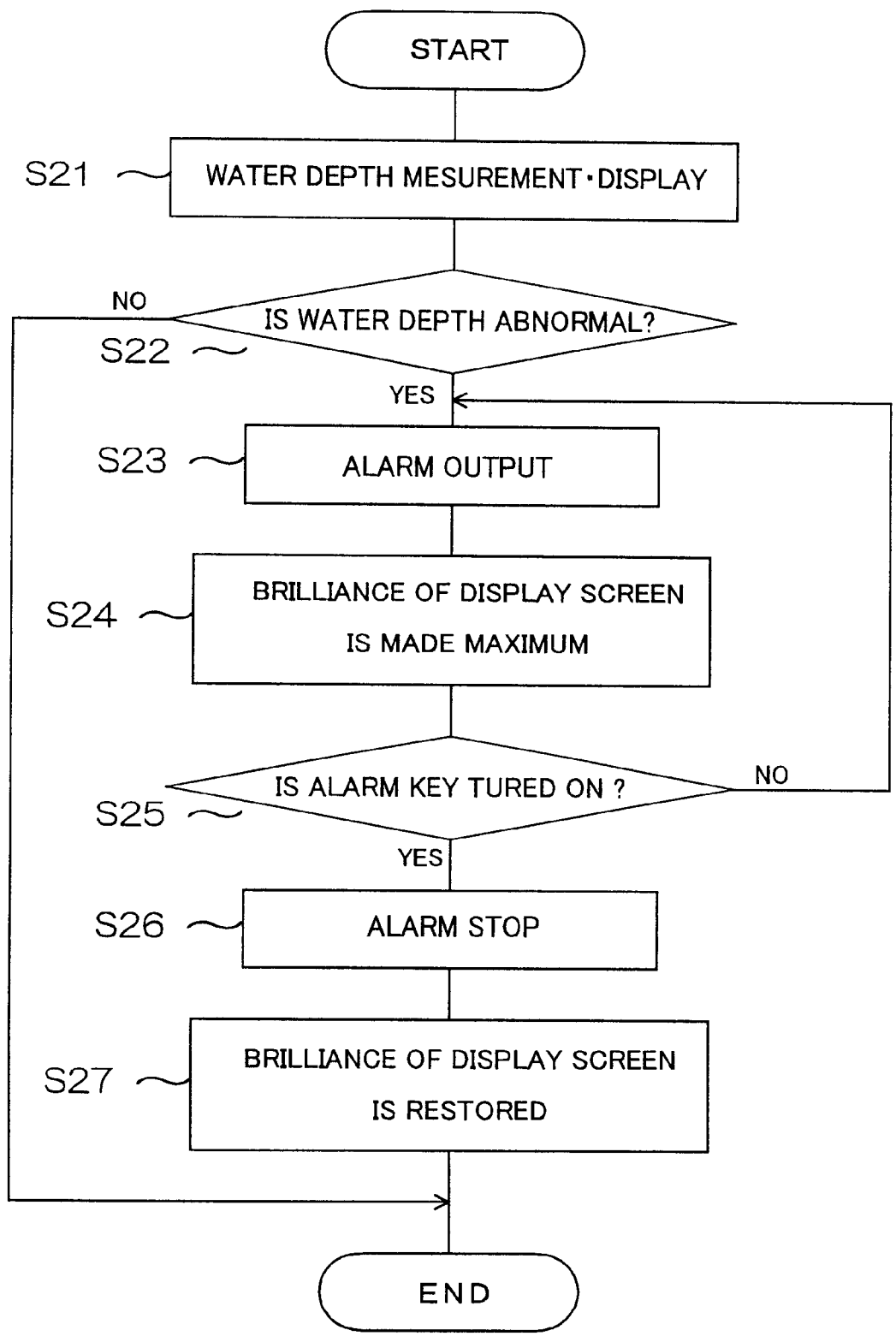
FIG. 24 is a flowchart showing an operation.

FIG. 24 is a flowchart showing the foregoing operation, and shows the procedure executed by the CPU of the control portion 106. The control portion 106 measures the water depth on the basis of the transmission/reception timing of the ultrasonic signals, and displays the resultant water depth on the display screen 121 of the display instrument 109 (step S21), and then, the control portion judges whether or not the water depth is abnormal, that is, whether or not the water depth is not larger than the set value of the alarm water depth mark 124 (step S22). If the water depth is not abnormal (NO at step S22), the procedure is ended. While, if the water depth is abnormal (YES at step S22), the alarm 128 is displayed on the display screen 121 of the display instrument 109 through the display control circuit 108, and the alarmcircuit 112 is driven to produce the alarm by the buzzer 113 (step S23). At the same time as this, the brilliance of the display screen 121 is raised to the maximum value through the brilliance adjustment circuit 110 (step S24).

Thereafter, it is judged whether or not the alarm key 133 is pressed (step S25), and if the alarm key 133 is not pressed (NO at step S25), steps S23 and S24 are repeated. If the alarm key 133 is pressed (YES at step S25), an instruction is given to the alarm circuit 112 to stop ringing of the buzzer 113, and the alarm 128 displayed on the display screen 121 is erased (step S26). Besides, at the same time as this, the control portion 106 gives an instruction to the brilliance adjustment circuit 110 and restores the brilliance of the display screen 121 to the former low brilliance (step S27).

The present invention is not limited to only the foregoing embodiment, but is capable of adopting various modifications in addition. For example, in the above embodiment, although the liquid crystal display is adopted as the display instrument 109, a CRT can be adopted instead of this. Besides, the alarm 128 of the display screen 121 may be displayed to flash on and off, and the volume of the alarm sound by the buzzer 113 may be increased as the water depth becomes shallow.

Further, the display apparatus of the present invention can be generally widely applied to an apparatus for outputting an emergency alarm in response to some change, such as a fish finding apparatus giving an alarm when a school of fish are detected, a radar plotter for giving an alarm when another ship enters a sea area within a predetermined distance from the present ship, or a water temperature meter for giving an alarm at a changing point of water temperature, in addition to the depth measuring apparatus described above. Besides, the present invention can be applied to not only such a single apparatus but also an apparatus of a combination of, for example, the fish finding apparatus and the depth measuring apparatus.

According to the present invention, since the screen of the display instrument comes to have high brilliance at the alarm time, the contents of the alarm can be instantaneously grasped and measures can be quickly taken. Besides, in the case where the alarm is given by sound as well, even in the case where the alarm sound is hard to hear because of surrounding noises or the like, the alarm can be recognized by the change in the brilliance of the screen, and hence, it becomes possible to prevent an accident such as stranding in advance.

Figure 25:
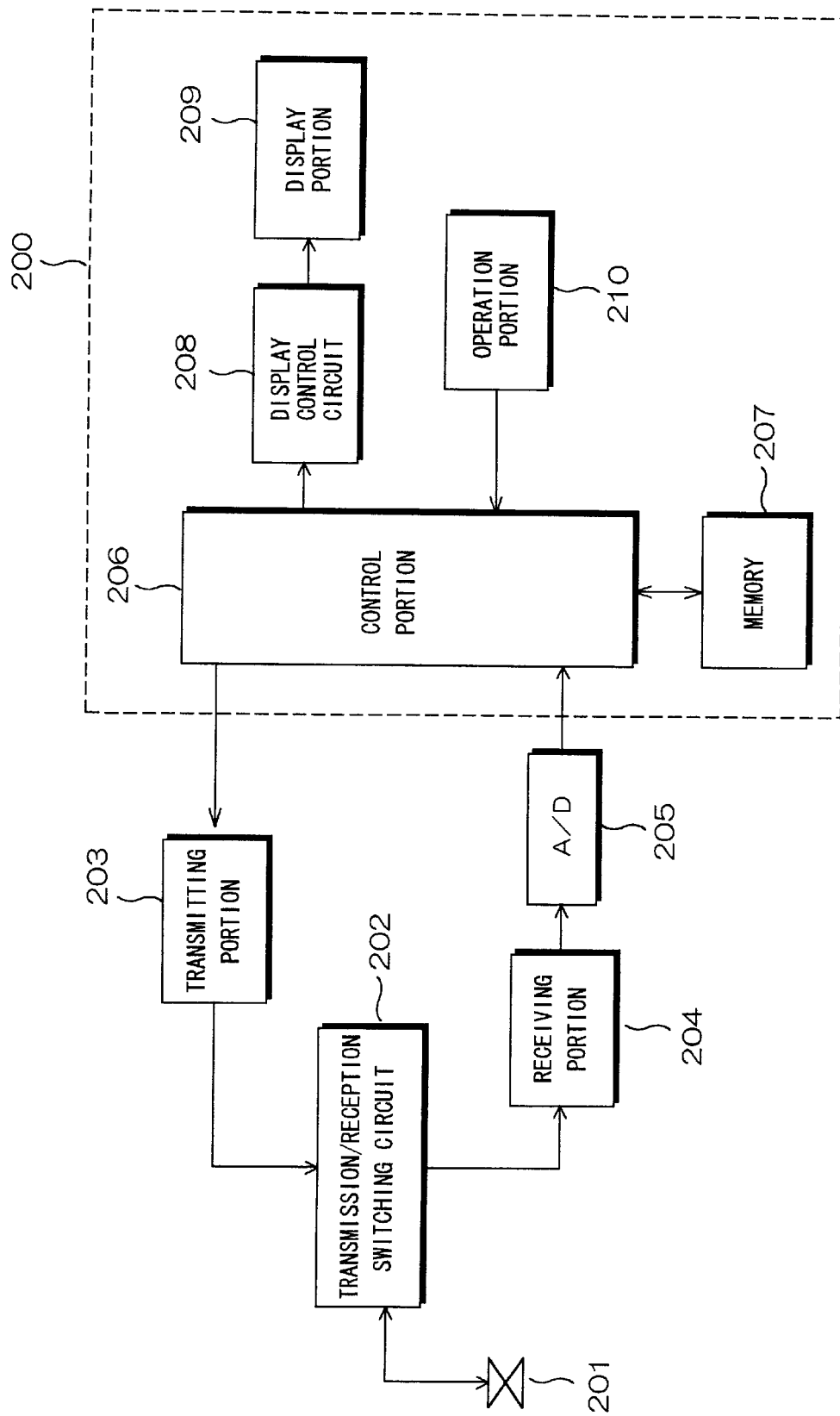
FIG. 25 is an electrical block diagram of a depth measuring apparatus of another embodiment of the present invention.

FIG. 25 is an electrical block diagram of a depth measuring apparatus of another embodiment of the present invention. In the drawing, reference numeral 201 designates a transducer which is provided on the bottom of a ship and transmits and receives an ultrasonic wave; 202, a transmission/reception switching circuit for switching the operation of the transducer 201 to a transmission side and reception side; 203, a transmitting portion for giving a transmission signal to the transducer 201 through the transmission/reception switching circuit 202; 204, a receiving portion for receiving an echo signal from the seabed received by the transducer 201 through the transmission/reception switching circuit 202; and 205, an A/D converter for converting an analog signal received by the receiving portion 204 into a digital signal. A measurement means for measuring water depth is constituted by the transducer 201, the transmission/reception switching circuit 202, the transmitting portion 203, the receiving portion 204, the A/D converter 205, and a control portion 206 which will be described hereinafter.

Reference numeral 206 designates a control portion including a CPU and for calculating the water depth to the seabed on the basis of output from the A/D converter 205; 207, a memory including a ROM storing a program of the CPU and a RAM storing various data; 208, a display control circuit for making the various data of the memory 207 displayed on a display portion 209; 209, the display portion comprised with a liquid crystal display driven by the display control circuit 208; and 210, an operation portion in which a plurality of keys described later are arranged. A display apparatus 200 of the present invention is constituted by the control portion 206, the memory 207, the display control circuit 208, the display portion 209, and the operation portion 210.

In the depth measuring apparatus constructed as above, when a transmission instruction is given to the transmitting portion 203 from the control portion 206, a transmission signal is outputted from the transmitting portion 203, and an ultrasonic pulse signal is emitted in a beam form from the transducer 201 to the seabed through the transmission/reception switching circuit 202 switched to the transmission side. This ultrasonic search signal is reflected by the seabed, and its echo signal is received by the transducer 201. This echo signal is received by the receiving portion 204 through the transmission/reception switching circuit 202 switched to the reception side, is converted into a digital signal by the A/D converter 205, and is given to the control portion 206.

The control portion 206 calculates a time from the emission of the ultrasonic pulse search signal to the reception of the echo signal, obtains the water depth to the seabed by calculation on the basis of the measured time, and stores the result in the memory 207. The display control circuit 208 outputs data read out from the memory 207 to the display portion 209, and various data including the water depth value to the seabed are displayed on the display portion 209.

Figure 26:
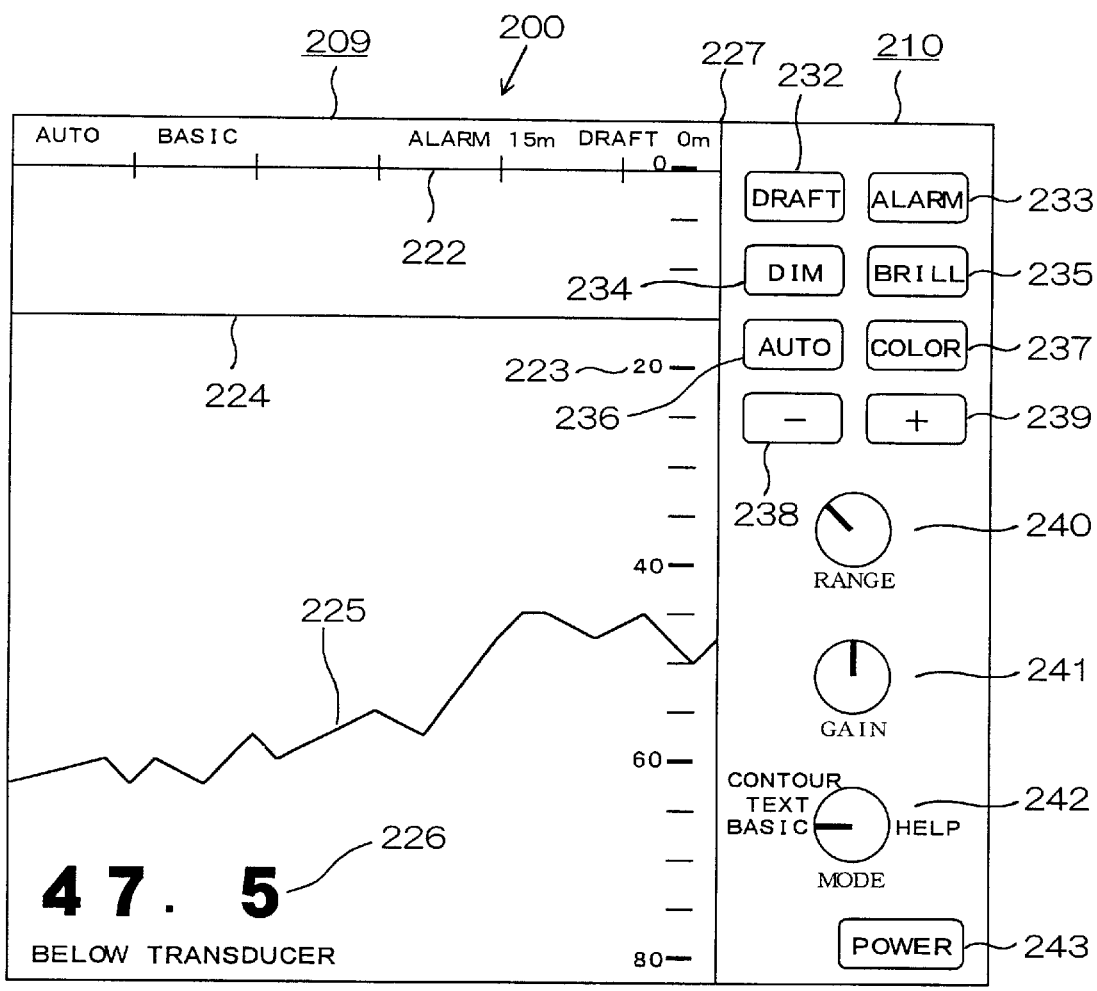
FIG. 26 is a view showing an example of a display apparatus.

FIG. 26 shows an example of the display apparatus 200. In the display apparatus 200, the operation portion 210 is provided adjacent to the display portion 209 comprised with the liquid crystal display. On the display portion 209, reference numeral 222 designates an oscillation line indicating the position of the transducer 201 on the bottom of a ship; 223, a water depth scale provided at 5 meter intervals; and 224, an alarm water depth line as a reference to produce an alarm. The alarm water depth line 224 can be arbitrarily set, and here, it is set at 15 m, and an alarm is given when the water depth is at this one or less. Reference numeral 225 designates a seabed line displayed on the basis of water depth measurement values, and is continuously displayed as a history on the basis of data for a predetermined definite time period. That is, the seabed line 225 at the position of a right end line 227 of the display portion 209 is the presently measured latest seabed line, and a past seabed line measured for a past definite time is displayed toward the left from this position. Reference numeral 226 designates a measured present water depth value, and the water depth value of 47.5 m of the seabed line 225 at the end 227 is displayed.

On the other hand, in the operation portion 210, reference numeral 232 designates a draft key for setting a draft value; 233, an alarm key for setting the foregoing alarm water depth line 224; 234, an illumination adjustment key for adjusting the panel illumination of the operation portion 210; 235, a brilliance adjustment key for adjusting the screen brilliance of the display portion 209; 236, an automatic key for switching the automatic/manual operation of a range, sensitivity or the like; 237, a color key for adjusting the color tone of the display portion 209; 238, a minus key for renewing the display of the water depth history displayed on the display portion 209 in a reverse direction (left direction) and for decreasing a set value; and 239, a plus key for renewing the display of the water depth history displayed on the display portion 209 in a positive direction (right direction) and for increasing the set value.

Reference numeral 240 designates a range switch for switching a display range of the display portion 209; 241, a gain switch for adjusting sensitivity; 242, a mode switch for switching a mode; and 243, a power switch of the display apparatus 200. The mode includes a BASIC mode for displaying a basic screen, a TEXT mode for displaying the water depth history in a table form, a CONTOUR mode for displaying the water depth history in a graph form, a HELP mode for displaying the explanation of operations and functions, and the like. In FIG. 26, the mode is set to the BASIC mode by the mode switch 242.

Figure 27:
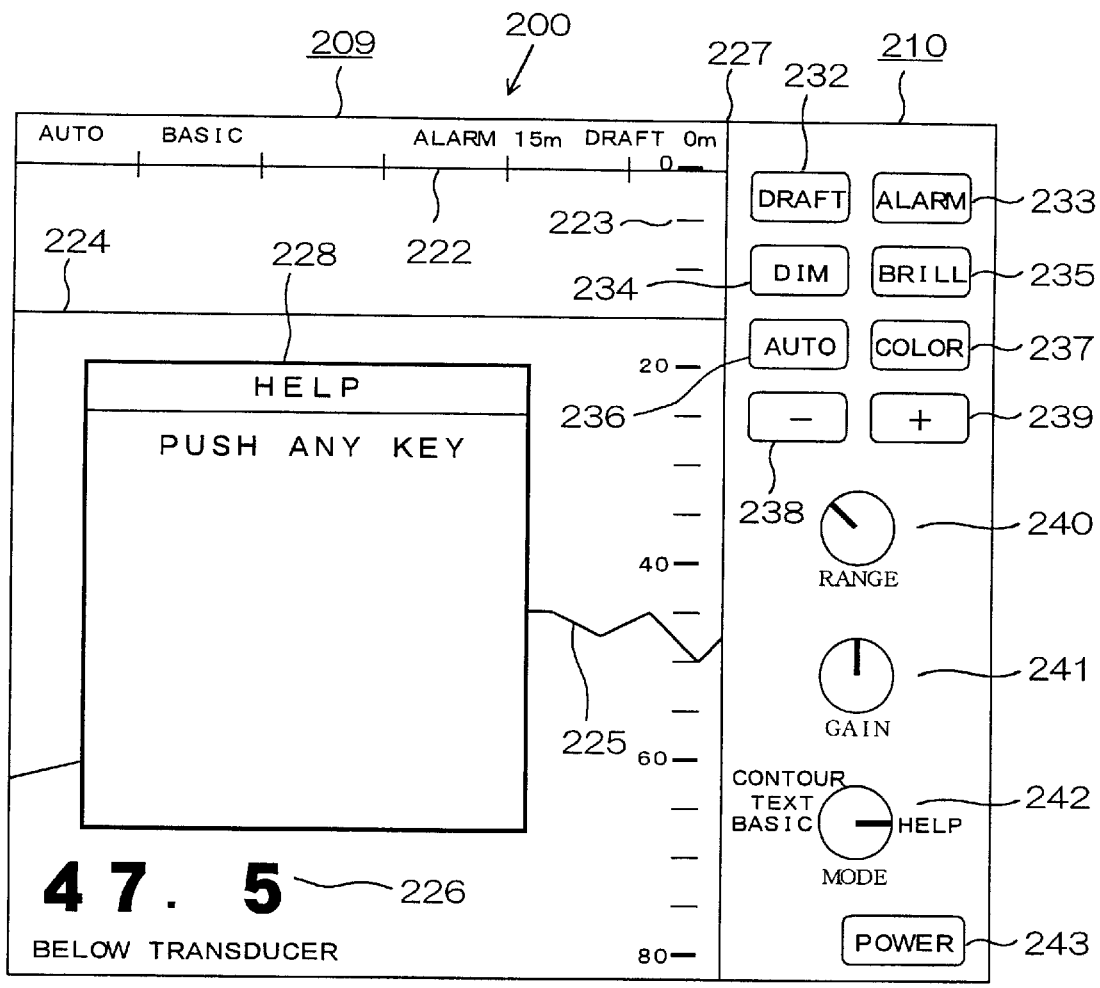
FIG. 27 is a view showing a case where a help screen is displayed on the display apparatus.

Next, the procedure for displaying the guidance of a key in the help mode will be described. As shown in FIG. 27, when the mode switch 242 is switched to the position of "HELP", the mode is set to the help mode, and a window for a help screen 228 is displayed on the display portion 209. On the help screen 228, an expression of "PUSH ANY KEY" is displayed, which indicates a state waiting any key to be pushed.

Figure 28:
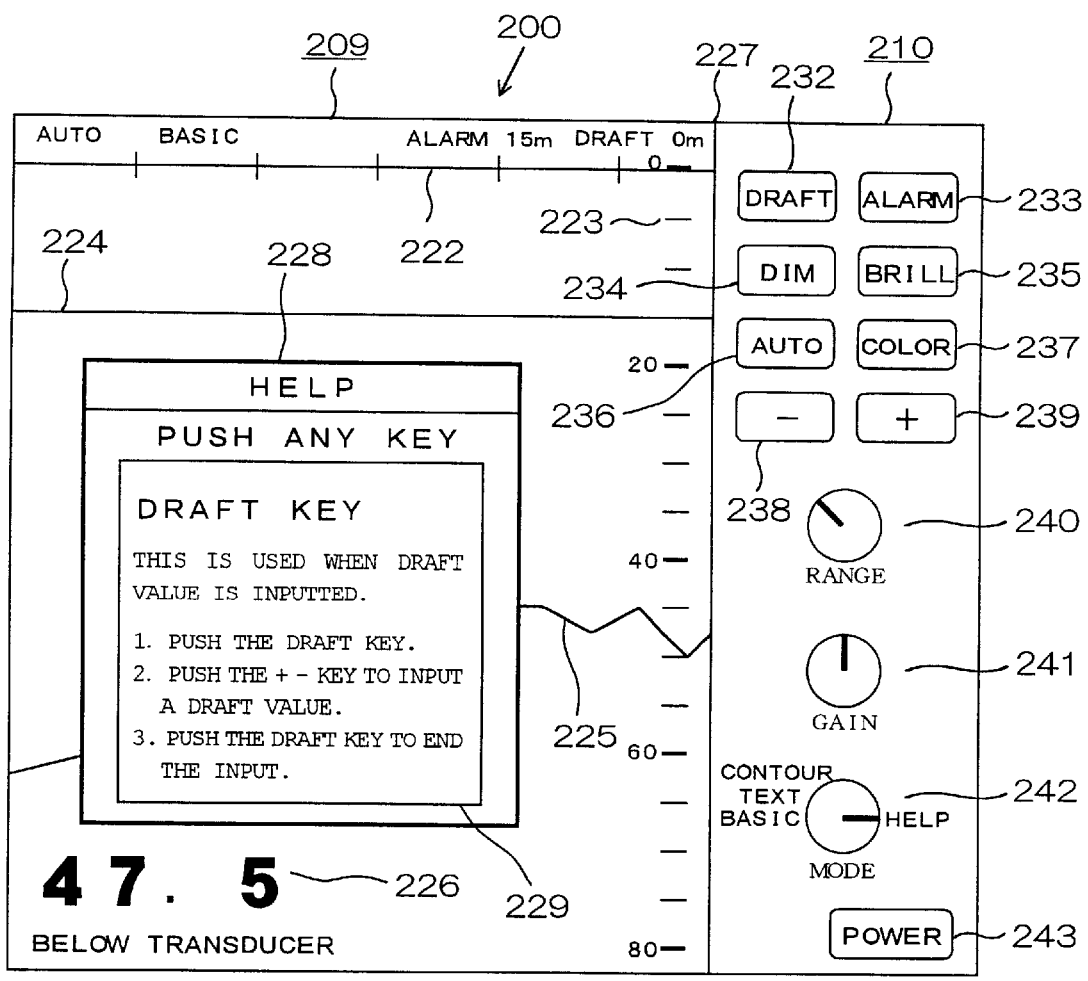
FIG. 28 is a view showing a case where guidance is displayed on the display apparatus.

Next, when any one of the keys 232 through 239 in the operation portion 210 is pushed, as shown in FIG. 28, guidance 229 as to the pushed key is displayed in the help screen 228. Here, there is shown a case where the draft key 232 for setting the draft value is pushed, and in the guidance 229, as the explanation of the function of the draft key 232, it is explained that the key is a key used when a draft value is inputted. Besides, the procedure of key operations in the case where the draft value is inputted is also displayed.

The operator looks at this guidance 229, and inputs the draft value by the draft key 232, the minus key 238, and the plus key 239. The inputted draft value is displayed at the portion of "DRAFT" at the right upper portion of the display portion 209. Since FIG. 28 shows the state before the draft value is inputted, the draft value is 0 m. When the draft value is inputted, the oscillation line 222 is shifted downward by an amount corresponding to the draft value, and the image of the seabed line 225 is also shifted downward together with that by the same amount.

In this way, in the case where the function and operation procedure of keys in the operation portion 210 are unknown, after the mode is set to the help mode by the mode switch 242, when a key whose guidance is desired to be displayed is pushed, the guidance 229 as to the key is immediately displayed, so that the function and operation procedure of the key can be easily known without performing any complicated operation.

Figure 29:
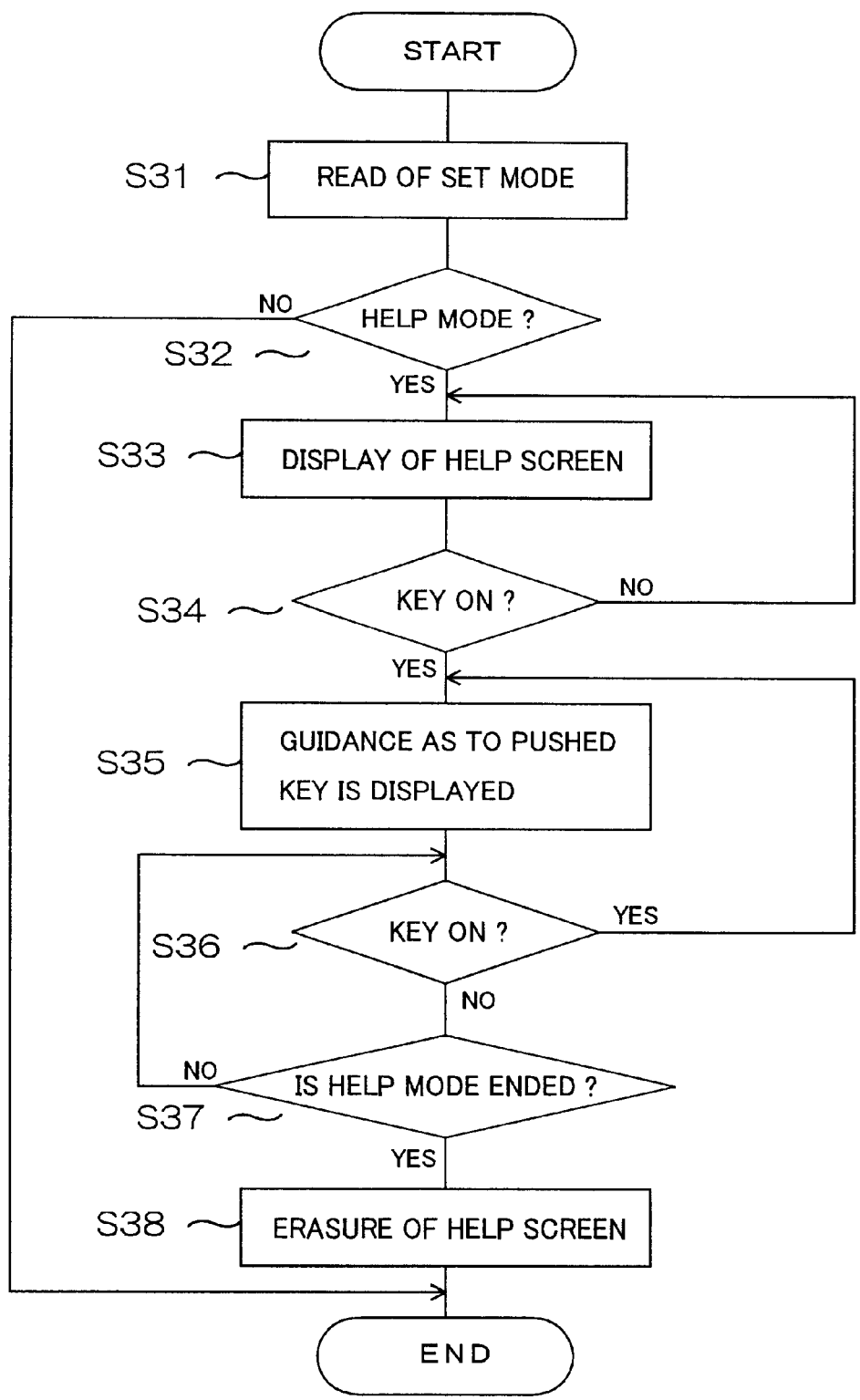
FIG. 29 is a flowchart showing an operation.

FIG. 29 is a flowchart showing the foregoing operation, and shows the procedure executed by the CPU of the control portion 206. The control portion 206 reads out the mode set by the mode switch 242 (step S31), and judges whether or not the mode is the help mode (step S32). If it is not the help mode (NO at step S32), the procedure is ended, and if it is the help mode (YES at step S32), the help screen 228 of FIG. 27 is displayed on the display portion 209 through the display control circuit 208 (step S33). The image data of this help screen 228 is stored in the memory 207 in advance.

Next, it is judged whether or not any one of the keys 232 through 239 of the operation portion 210 is pushed (step S34), and if a key is not pushed (NO at step S34), the display of the help screen 228 is continued (step S33), and if a key is pushed (YES at step S34), the guidance 229 as to the key is displayed on the help screen 228 (step S35). The image data of this guidance 229 corresponding to each key is also previously stored in the memory 207.

Next, it is judged again whether or not a key is pushed (step S36). Here, if another key is pushed (YES at step S36), the guidance as to the key is displayed on the help screen 228 (step S35), and renewal of the guidance 229 is performed. That is, while the mode is set to the help mode, each time a new key is pushed, the guidance 229 as to the key is renewed and is displayed.

If a key is not pushed at step S36 (NO at step S36), it is judged whether or not the help mode is ended, that is, the mode switch 242 is switched to another mode (step S37), and if it is switched to another mode (YES at step S37), the help screen 228 is erased and the procedure is ended (step S38). If the help mode is not ended (NO at step S37), the procedure returns to step S36, and the foregoing steps are repeated.

The present invention can adopt various modifications in addition to the foregoing embodiment. For example, in the foregoing embodiment, although the liquid crystal display is adopted for the display portion 209, a CRT can be adopted in place of this.

Besides, in the above embodiment, although the mode display in the case where the help mode is set by the mode switch 242 is "HELP", the help mode in the present invention indicates the mode for displaying the guidance as to keys, and is not necessarily limited to only the case where the mode name is "HELP". Thus, as long as a guidance mode, a guide mode, or a mode such as an abstract X mode is a mode for displaying the guidance as to keys, all of them are included in the help mode of the present invention.

Besides, in the above embodiment, although the guidance 229 is displayed by pushing an actual key of the operation portion 210 in the help mode, it is also possible that keys of the operation portion 210 are displayed on the help screen 228, and by pushing this key, the guidance 229 of the key may be displayed. In this case, the display portion 209 has only to be constituted by a touch panel.

Besides, in the above embodiment, although the guidance 229 is renewed each time a key is pushed in the help mode, it is also possible that the guidance 229 may be displayed side by side as a multi-window each time a key is pushed.

Further, the display apparatus of the present invention can be widely applied to another apparatus provided with keys and a display portion, such as a fish finding apparatus, a tidal current meter, or a water temperature meter, in addition to the depth measuring apparatus described above. Besides, the present invention can be applied to not only such a single apparatus but also an apparatus of a combination of, for example, the fish finding apparatus and the depth measuring apparatus.

According to the present invention, by merely pushing an objective key in a help mode, the guidance as to the key is instantaneously displayed, so that it becomes unnecessary to search and select an item from a menu and contents contrary to the prior art, the operation becomes very simple, and the working efficiency is greatly improved.

What is claimed is:

1. An underwater detecting apparatus comprising:
    a transducer for emitting an ultrasonic signal into the water from a fixed place on a ship and for receiving echo signals; and
    an indicator for displaying underwater information, wherein the indicator displays a first screen on which water depth information obtained based on the echo signals is historically displayed and a second screen on which fish school detection information obtained based on the echo signals is displayed, wherein the historically displayed information includes at least 15 minutes of prior information, and wherein said first and second screens are simultaneously displayed on said indicator.

2. An underwater detecting apparatus according to claim 1, wherein the first and second screens are displayed side by side on the display instrument.

3. An underwater detecting apparatus according to claim 1, wherein the first and second screens are switched and either one of them is displayed.

4. An underwater detecting apparatus according to claim 1, wherein a water depth is measured by using ultrasonic signals of two frequencies used for fish school detection.

5. An underwater detecting apparatus according to claim 1, wherein on the first screen, the water depth information over a past time period is scrolled, and display contents are renewed in an area unit of 1/n of all display area, wherein n is an arbitrary number greater than 1.

6. An underwater detecting apparatus according to claim 1, wherein the first screen is divided in two, water depth information over a past time period is displayed on one display screen, latest water depth information including a present measured depth is displayed on the other screen, and display contents on the one display screen is scrolled in an area unit of 1/n of all display area of the one screen, wherein n is an arbitrary number greater than 1.

7. An underwater detecting apparatus according to claim 1, wherein a frequency of an ultrasonic wave is automatically switched to a high frequency or a low frequency in accordance with a water depth.

8. An underwater detecting apparatus according to claim 1, wherein a change in water depth up to now is calculated on the basis of past water depth data, and a result is displayed with a mark on the first screen.

9. An underwater detecting apparatus according to claim 1, wherein a draft value is to be set on the first or second screen, when the draft value is set, an oscillation line is not moved but a water depth scale is shifted upward.

10. An underwater detecting apparatus according to claim 1, wherein the water depth information historically displayed comprise 24 hours of historical data.

11. An underwater detecting apparatus according to claim 1, wherein the water depth information historically displayed is displayed in a table format.

12. An underwater detecting apparatus according to claim 1, wherein the water depth information historically displayed is displayed in a graphic form when a contour mode is selected and a table form when a text mode is selected.

13. The underwater detecting apparatus of claim 1, wherein the historical water depth information is based on plural detection signals obtained in a definite period.

14. An underwater detecting apparatus comprising:
    a transducer for emitting an ultrasonic signal into the water from a fixed place on a ship and for receiving echo signals; and
    an indicator for displaying underwater information, wherein the indicator displays a first screen on which water depth information including a seabed line obtained based on an echo signal received by said transducer is historically displayed and a second screen on which fish school detection information obtained based on an echo signal received by said transducer is displayed, wherein said first and second screens are simultaneously displayed on said indicator.

15. The underwater detecting apparatus of claim 14, wherein the historical water depth information is based on plural detection signals obtained in a definite period.

* * * * *